United States Patent
Heeter et al.

(10) Patent No.: US 10,104,419 B2
(45) Date of Patent: *Oct. 16, 2018

(54) CONTEXTUAL REMOTE CONTROL INTERFACE

(71) Applicant: MICROSOFT TECHNOLOGY LICENSING, LLC, Redmond, WA (US)

(72) Inventors: Ross David Heeter, Seattle, WA (US); Jason Robert Tuck, Kirkland, WA (US); Cyrus Kanga, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,219

(22) Filed: Nov. 18, 2016

(65) Prior Publication Data

US 2017/0070767 A1    Mar. 9, 2017

Related U.S. Application Data

(63) Continuation of application No. 14/318,889, filed on Jun. 30, 2014, now Pat. No. 9,554,189.

(51) Int. Cl.
*H04N 5/765* (2006.01)
*H04N 21/422* (2011.01)
(Continued)

(52) U.S. Cl.
CPC ... *H04N 21/42227* (2013.01); *G06F 3/04883* (2013.01); *G06F 3/04886* (2013.01);
(Continued)

(58) Field of Classification Search
CPC . G06F 3/04883; G06F 3/04886; G08C 23/04; H04N 21/42219; H04N 21/4222;
(Continued)

(56) References Cited

U.S. PATENT DOCUMENTS 6,765,557 B1    7/2004   Segal et al.
7,436,346 B2   10/2008   Walter et al.
(Continued)

FOREIGN PATENT DOCUMENTS

CN         103731699 A        4/2014

OTHER PUBLICATIONS

Lin, et al., "Content-aware Smart Remote Control for Android-based TV", In Proceedings IEEE International Conference on Consumer Electronics, Jan. 13, 2012, 2 pages.
(Continued)

*Primary Examiner* — Robert Chevalier
(74) *Attorney, Agent, or Firm* — Shook, Hardy & Bacon, L.L.P.

(57) ABSTRACT

Embodiments of the present invention provide a contextual remote control interface, which is a companion application that allows a user to use a companion device to control experiences generated by an application running on a primary device. Web browsers, games, and streaming media applications are examples of applications running on a primary device that may be controlled using the companion device. Interfaces associated with each of the media applications on the primary device may be displayed on a television or other device coupled to the primary device. A unique set of virtual controls are included in the remote control interface for each application and may be tailored to the current state of the application.

20 Claims, 14 Drawing Sheets

(51) Int. Cl.
  *H04N 21/472* (2011.01)
  *G08C 23/04* (2006.01)
  *G06F 3/0488* (2013.01)
  *H04N 21/436* (2011.01)

(52) U.S. Cl.
  CPC ......... *G08C 23/04* (2013.01); *H04N 21/4222* (2013.01); *H04N 21/42219* (2013.01); *H04N 21/42221* (2013.01); *H04N 21/42224* (2013.01); *H04N 21/43615* (2013.01); *H04N 21/47217* (2013.01)

(58) Field of Classification Search
  CPC ....... H04N 21/42221; H04N 21/42224; H04N 21/42227; H04N 21/43615; H04N 21/47217
  USPC ....... 386/234, 231, 230, 239, 248, 262, 291, 386/299
  See application file for complete search history.

(56) References Cited

U.S. PATENT DOCUMENTS

| | | |
|---|---|---|
| 8,356,251 B2 | 1/2013 | Strober |
| 2008/0024500 A1* | 1/2008 | Bae ....................... G06T 11/203 345/442 |
| 2009/0153288 A1 | 6/2009 | Hope et al. |
| 2011/0191516 A1 | 8/2011 | Xiong et al. |
| 2012/0162536 A1 | 6/2012 | Sibilsky et al. |
| 2012/0216152 A1 | 8/2012 | Li |
| 2012/0274863 A1 | 11/2012 | Chardon et al. |
| 2013/0091246 A1 | 4/2013 | Urbanski |
| 2013/0205212 A1 | 8/2013 | Sinha et al. |
| 2013/0262687 A1 | 10/2013 | Avery et al. |
| 2013/0321268 A1 | 12/2013 | Tuck et al. |
| 2014/0029913 A1 | 1/2014 | Lopez et al. |
| 2014/0201256 A1 | 7/2014 | Pinheiro et al. |

OTHER PUBLICATIONS

Non-Final Office Action dated Oct. 30, 2015 for U.S. Appl. No. 14/318,889, 8 pages.
Final Office Action dated Apr. 1, 2016 for U.S. Appl. No. 14/318,889, 5 pages.
Notice of Allowance dated Sep. 21, 2016 for U.S. Appl. No. 14/318,889, 6 pages.

* cited by examiner

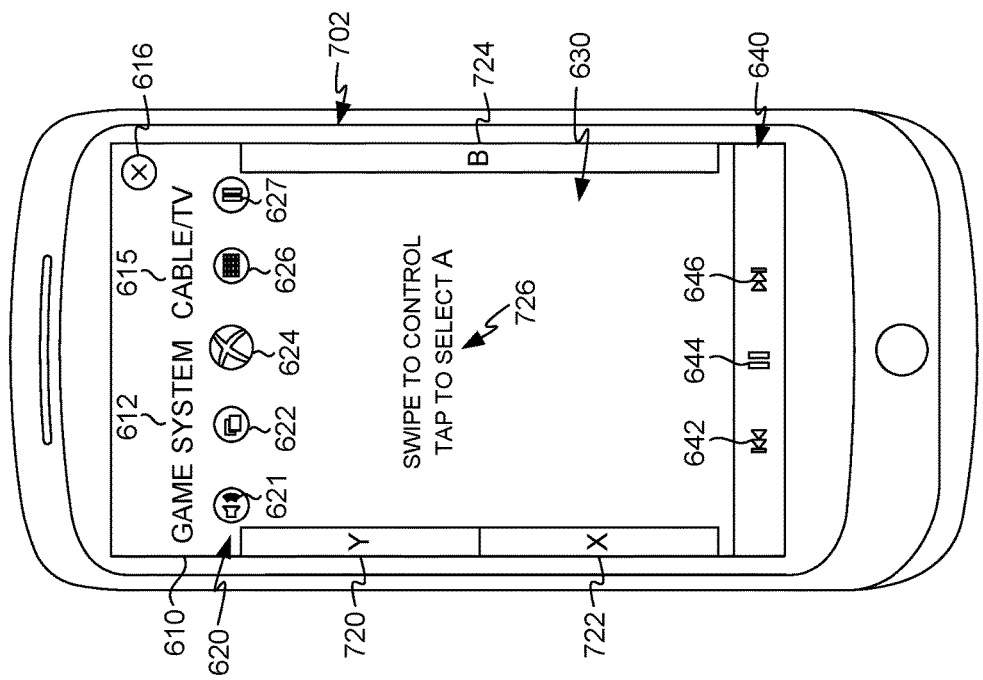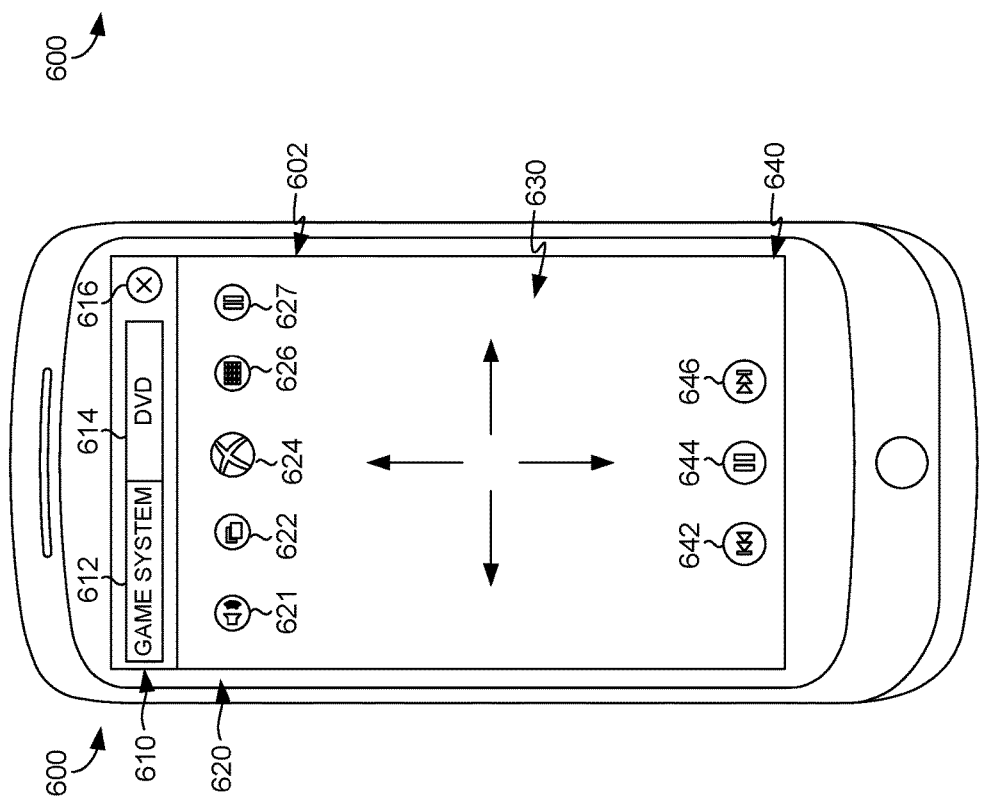

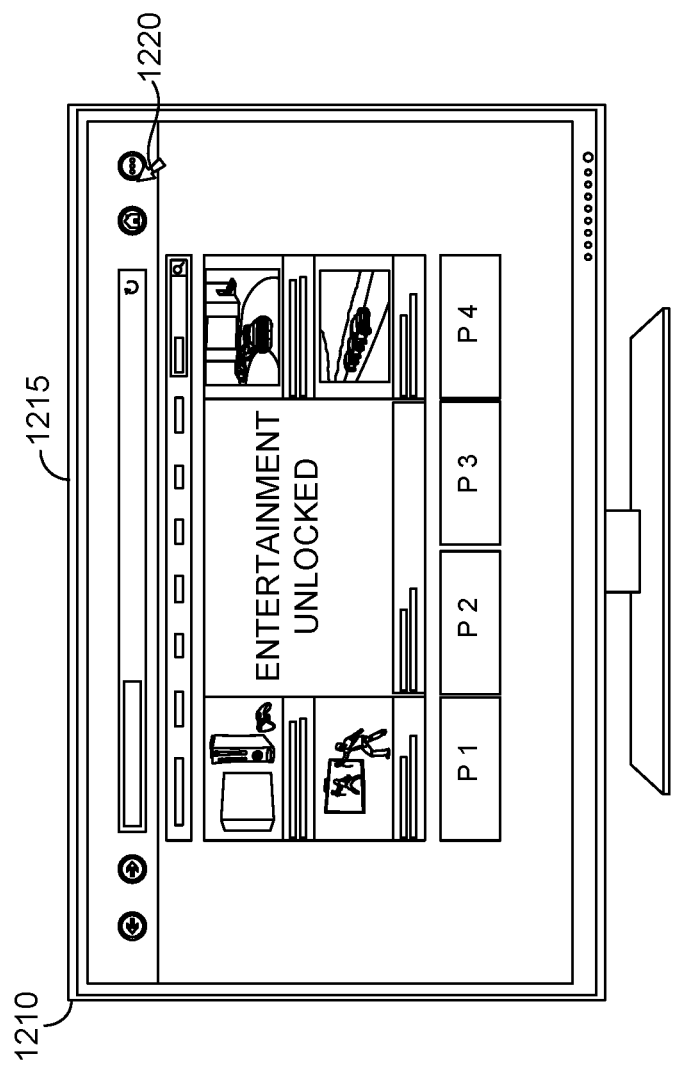
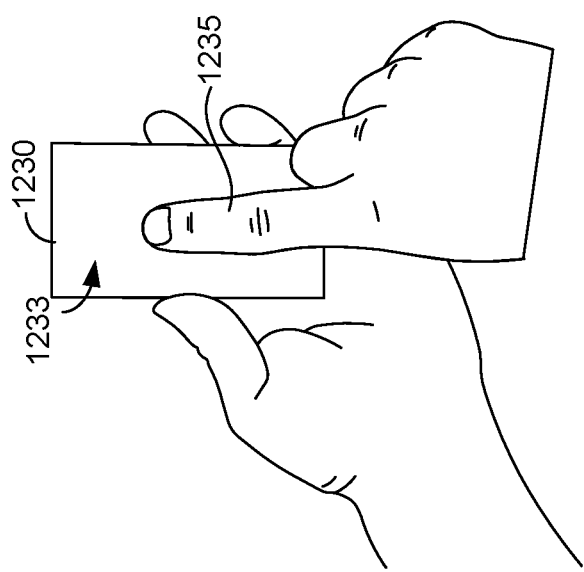
FIG. 12.

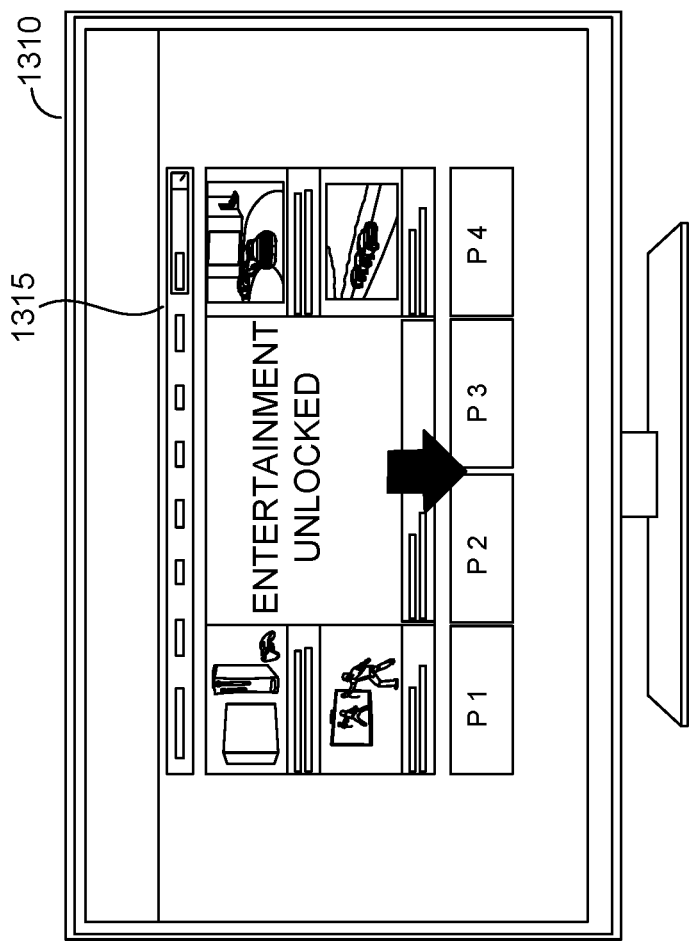
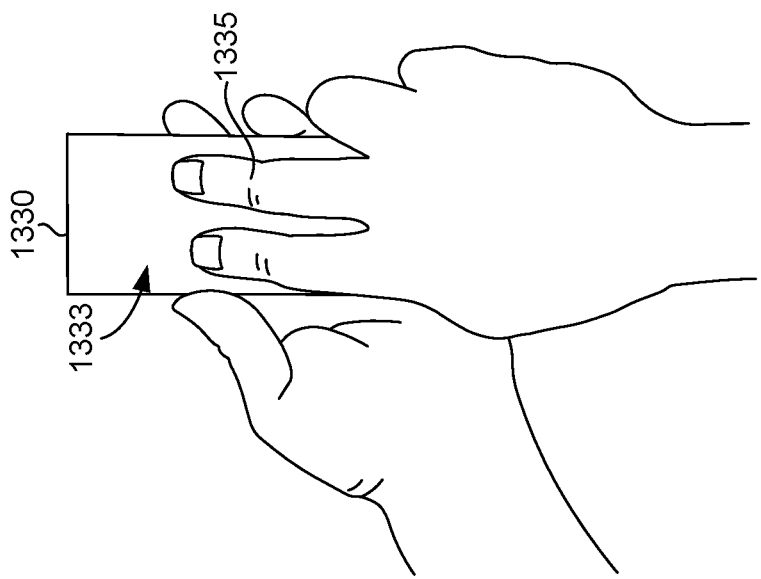
FIG. 13.

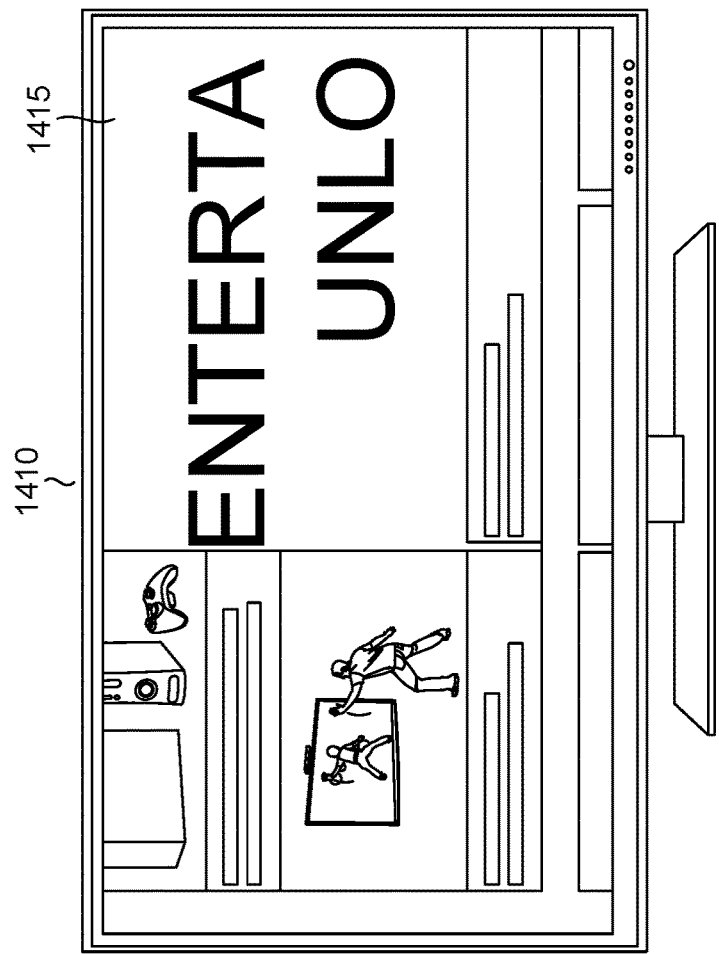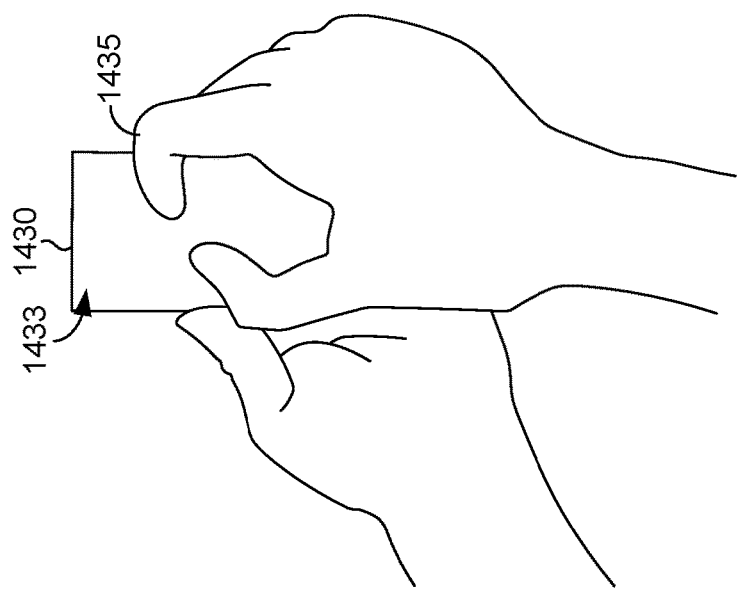
FIG. 14.

CONTEXTUAL REMOTE CONTROL INTERFACE

CROSS-REFERENCE TO RELATED APPLICATIONS

This application is a continuation of U.S. patent application Ser. No. 14/318,889, filed Jun. 30, 2014, and titled "CONTEXTUAL REMOTE CONTROL INTERFACE," the entirety of which is hereby incorporated by reference.

BACKGROUND

Increasingly, televisions are used to display interactive content. For example, primary devices such as game consoles, digital video recorders (DVR), and the televisions will present web browser interfaces and media selection interfaces that can require complex navigation. In particular, these interfaces may require a user to scroll various selectable objects and to select an object. The interfaces may also require textual input.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In one aspect, a method of using a contextual remote control interface on a companion device to control an entertainment experience through a primary device is provided. The method comprises detecting, at the companion device, a user interaction that triggers the contextual remote control interface to open. The contextual remote control interface generated by a control application running on the companion device. The method also comprises determining that a remote selection is currently on the primary device, rather than at least one other entertainment hardware component controllable by the primary device. The method also includes determining that a targeting of the control application is on a first media application running on the primary device. The method also includes determining that a media engagement status of the first media application is engaged with a first media title. The method also includes determining a state of play for the first media title. The method also includes, in response to the user interaction, outputting for display on the companion device the contextual remote control interface that includes a plurality of virtual play controls tailored for a set of capabilities of the first media application. The media engagement status of the first media application, and the state of play for the first media title. The method also includes, receiving a user interaction with a virtual play control on the contextual remote control interface. The method also includes communicating, from the companion device to the primary device, a control command consistent with the user interaction with the virtual play control.

BRIEF DESCRIPTION OF THE DRAWINGS

Embodiments of the invention are described in detail below with reference to the attached drawing figures, wherein:

FIG. 6 is a diagram of a companion device showing a control interface that can control active applications on a primary device, in accordance with an embodiment of the present invention;

FIG. 7 is a diagram of a companion device showing a control interface that can control active applications on a primary device using edge buttons that map to gamepad buttons, in accordance with an embodiment of the present invention;

FIG. 12 is a diagram showing a cursor on the game console's web browser being controlled by dragging a finger across the touch surface of the companion device, in accordance with an embodiment of the present invention;

FIG. 13 is a diagram showing a user panning down a page displayed on the game console's web browser by dragging two fingers across the touch surface of the companion device, in accordance with an embodiment of the present invention;

FIG. 14 is a diagram showing a user zooming into a page displayed on the game console's web browser by pinching two fingers across the touch surface of the companion device, in accordance with an embodiment of the present invention;

DETAILED DESCRIPTION

Figure 1:
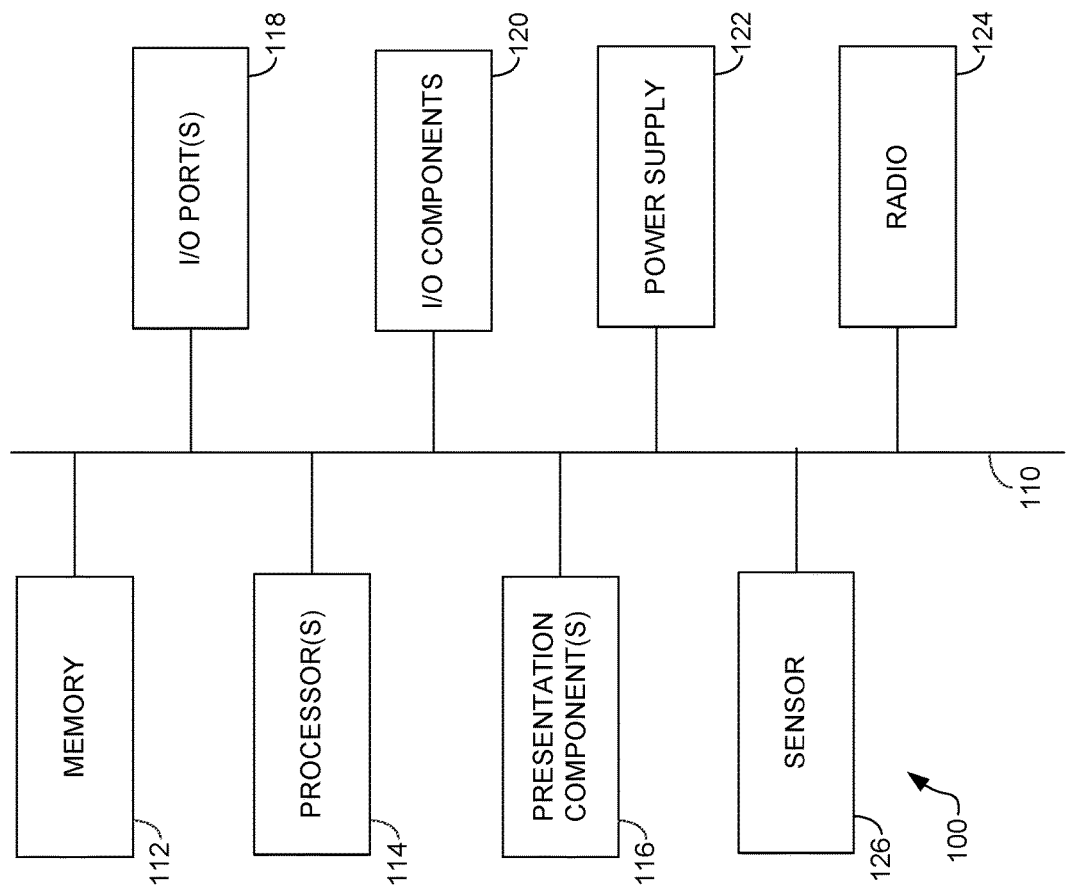
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the invention relate to a contextual remote control, which is a companion application that allows a user to use a companion device to control experiences generated by an application running on a primary device. Web browsers, games, and streaming media applications are examples of applications running on a primary device that may be controlled using the companion device. Interfaces associated with each of the media applications on the primary device may be displayed on a television or other device coupled to the primary device. A unique set of virtual controls may be selected for each application and be tailored to the current state of the application.

Aspects of the present invention may use a companion device to control a gaming device. Gaming devices, such as game consoles, are often controlled by a gamepad. The virtual control interface may include one or more virtual controls from a gamepad. For example, a virtual control interface may include frequently used buttons, such as the face buttons on the game used to select an item and go back.

Aspects of the present invention allow a touch screen companion device to operate as a gamepad to control a primary device. Exemplary gamepads include the Xbox 360 controller, Xbox One controller, Wii Remote, Wii U™ GamePad and Sony's DualShock®3. Generally, a gamepad will include multiple input controls, including a directional pad, buttons, triggers, and one or more sticks. A gamepad can include between 10 and 20 inputs.

Aspects of the present invention provide a virtual control interface that includes virtual game controls that can perform the same function as a directional pad, buttons, triggers, and sticks found on a gamepad. The virtual game controls can be ergonomically located on the touch screen to accommodate different hand sizes and methods of holding a touch screen device. In one aspect, the face buttons are located along the edge of the screen to facilitate "no look" selection.

In one aspect, the virtual control interface provides an output that is substantially similar to an output generated by a gamepad able to interact with the gaming device. Substantially similar outputs allow a gaming device to respond to a functional control from a gamepad and an equivalent functional control from the virtual control interface in the same way and without translation. For example, pushing the blue face button on the gamepad and pushing the corresponding virtual blue face button on the virtual control interface will result in the gaming device receiving the same functional signal.

The signal generated by the touch screen device and a gamepad may differ in some ways, for example, different devices may generate different identification information. In another aspect, the touch screen device can communicate commands through a different communication channel, such as WI-FI, from the one used by the gamepad, such as infrared. When different channels are used, the functional instruction generated by the touch screen device may still be similar to the functional instruction generated by a gamepad.

In another aspect, a primary device translates commands received from the companion device into commands accepted by the game running on the gaming device. In this way, the gaming device on which the game title is running translates the different command forms into a common form understood by the game title. Thus, when the blue face button is pushed on a gamepad and when the virtual blue face button is pushed on the virtual control interface, the gaming device translates both inputs into the same command for the game.

As used herein, a "primary device" is a computing device that includes hardware and software that enables the primary device to run multiple media applications simultaneously and output a media presentation. The primary device is a consumer device that may be located in a user's residence and is not a remote server. Exemplary primary devices include a game console, a laptop computer, a personal computer, a television, a tablet, a smartphone, a set top box, and such.

The primary device may connect to multiple output devices to create an entertainment experience for the user. For example, a game console could be connected directly or indirectly to a television through which both video and audio output are presented. A game console could also be connected to an audio receiver that outputs audio content to speakers and visual content to a television. The primary device may also have audio and visual output mechanisms, such as a screen or speakers, built in.

As used herein, a "companion device" is a computing device with hardware components and software needed to generate a visible interface and input mechanisms the user can manipulate to interact with the interface. The companion device also has the ability to communicate with the primary device. For example, the companion device may have radio hardware and software necessary to connect to a wireless router and/or form a Bluetooth connection with the primary device. Alternatively, the companion device could use a wired connect such as a USB or Ethernet connection to communicate with the primary device. Exemplary companion devices include smartphones, tablets, and tablet PCs. In one aspect, the companion device includes hover screen technology, which allows the presence of an object to be detected above the screen without touching the screen. Objects may be selected by hovering over the object without touching. As used herein, a user interaction can include hovering.

As used herein, a "media application" is an application that processes digital content to generate a user experience of the content. The user experience may include audio, visual, and tactile content. Exemplary media applications include an Internet browser, an entertainment streaming application (e.g., movie or audio streaming), a DVD playing application, a game application, a broadcast TV application, and such. The DVD application can read content on a DVD and deploy the primary device's hardware and software resources to present the DVD content to the viewer. The game application is not a video game title, but an application that deploys the primary device's hardware and software to execute the game code and create the game experience for the user.

Some media applications are able to be controlled by the control application on the companion device and others are not. In aspect, media applications that are able to be controlled are those that include that include an application program interface for the control application. Further, the user may be able to set preferences for whether or not an application can be controlled by the companion device. In aspects using user preferences, applications that are able to be controlled are those the user has given permission to be controlled.

As used herein, an application is in "control focus" on the primary device when the user is actively interacting with the application. The primary device uses a direct focus model that requires the user to focus on an application to manipulate the application. For example, when a user is playing a game title through the game application, then the game application is in control focus. Other applications maybe running simultaneously and be out-of-control focus. In one aspect, only a single application can be in control focus at a point in time.

As used herein, an application is "out-of-control focus" when the application is running but is not receiving active user interaction through the primary device. An application that is closed would not be running, and thus not out-of-control focus.

The applications may generate a graphical user interface that is displayed in a viewport associated with the application. As used herein, a "viewport" is a portion of a display allocated to an interface generated by the application. The viewport may be an application window. The viewport can be square, rectangular, or some other shape. The viewport may run in the foreground or the background. As used herein, "foreground" means the viewport is visible. As used herein, "background" means the viewport is not visible. An application may have a visible tab, icon, tile, or other indication and still be in the background.

The media titles are the entertainment content presented in the user experience. Different media applications can engage with different types of media titles. For example, an audio player may engage with songs in an MP3 format. A movie streaming application may receive a rendered video image of a movie title through a network connection.

As used herein, a "virtual control" is a software generated control. The virtual control is not a dedicated hardware control such as a volume button, knob, or similar. In one aspect, the virtual control is displayed on a touch screen and can be manipulated through the touch screen. For example, a contact on the touch screen corresponding to a location where the virtual control is displayed may constitute pressing the virtual control. Additional touch screen interactions with the virtual control are possible. Oher possible interactions with a virtual control include sliding, spinning, tapping, and such. Another example of a virtual control is a virtual keyboard.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, gamepad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Companion Environment

Figure 2:
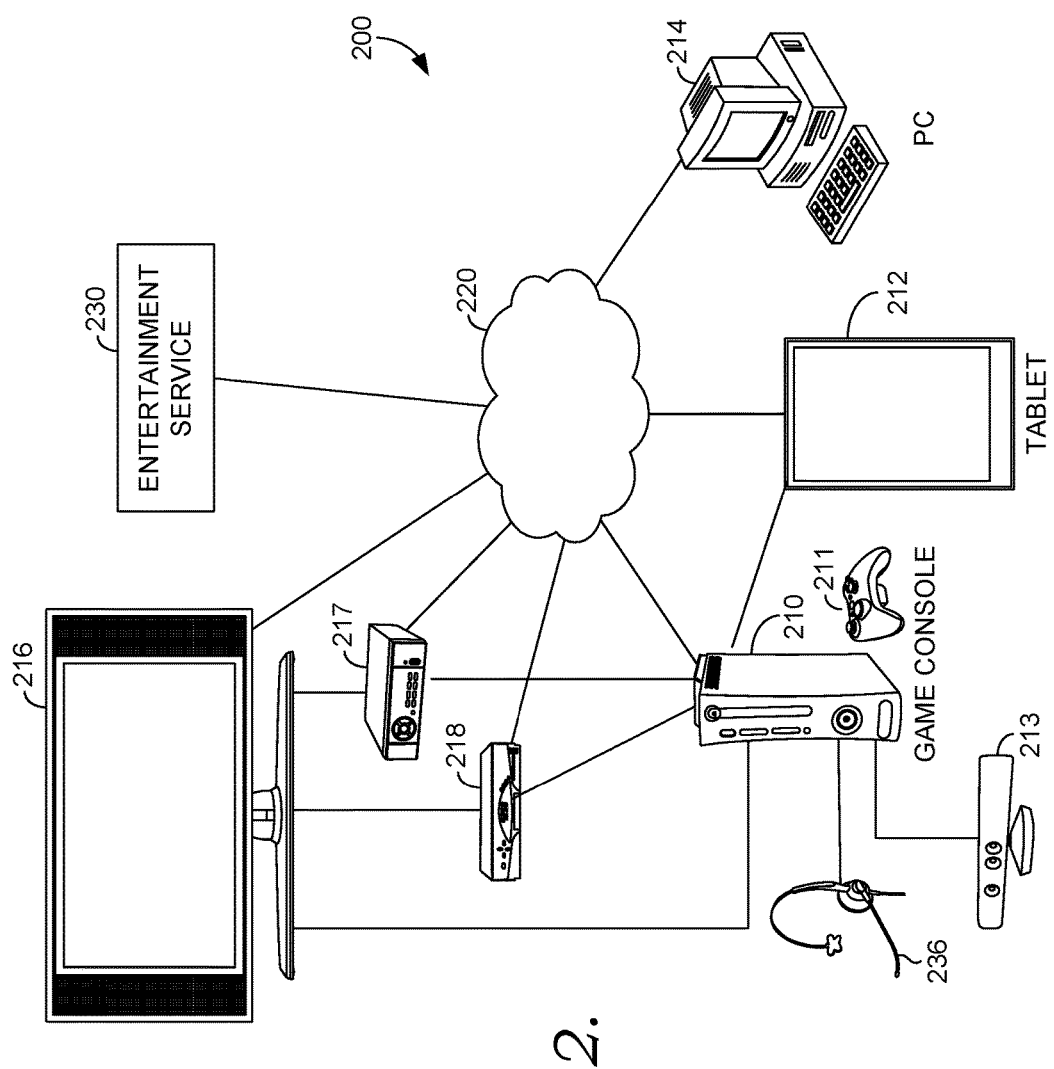
FIG. 2 is a diagram illustrating a variety of communication mediums between primary devices, online services, and companion devices, in accordance with an embodiment of the present invention.

Turning now to FIG. 2, an online entertainment environment 200 is shown, in accordance with an embodiment of the present invention. The online entertainment environment 200 comprises various entertainment devices connected through a network 220 to an entertainment service 230. The entertainment devices may also be directed connected to one another. Exemplary entertainment devices include a game console 210, a tablet 212, a personal computer 214, a digital video recorder 217, a cable box 218, and a television 216. Use of other entertainment devices not depicted in FIG. 2, such as smart phones, is also possible.

The game console 210 may have one or more game controllers communicatively coupled to it. In one embodiment, the tablet 212 may act as an input device for the game console 210 or the personal computer 214 as a companion device. Network 220 may be a wide area network, such as the Internet. As can be seen, most devices shown in FIG. 2 could be directly connected to the network 220. The devices shown in FIG. 2, are able to communicate with each other through the network 220 and/or directly as indicated by the lines connecting the devices.

The controllers associated with game console 210 include a gamepad 211, a headset 236, an imaging device 213, and a tablet 212. Tablet 212 is shown coupled directly to the game console 210, but the connection could be indirect through the Internet or a subnet. In one embodiment, the entertainment service 230 helps make a connection between the tablet 212 and the game console 210. The tablet 212 is capable of generating numerous input streams and may also serve as a display output mechanism. In addition to being a primary display, the tablet 212 could provide supplemental information related to primary information shown on a primary display, such as television 216. The input streams generated by the tablet 212 include video and picture data, audio data, movement data, touch screen data, and keyboard input data.

The headset 236 captures audio input from a player and the player's surroundings and may also act as an output device, if it is coupled with a headphone or other speaker.

The imaging device 213 is coupled to game console 210. The imaging device 213 may be a video camera, a still camera, a depth camera, or a video camera capable of taking still or streaming images. In one embodiment, the imaging device 213 includes an infrared light and an infrared camera. The imaging device 213 may also include a microphone, speaker, and other sensors. In one embodiment, the imaging device 213 is a depth camera that generates three-dimensional image data. The three-dimensional image data may be a point cloud or depth cloud. The three-dimensional image data may associate individual pixels with both depth data and color data. For example, a pixel within the depth cloud may include red, green, and blue color data, and X, Y, and Z coordinates. Stereoscopic depth cameras are also possible. The imaging device 213 may have several image-gathering components. For example, the imaging device 213 may have multiple cameras. In other embodiments, the imaging device 213 may have multidirectional functionality. In this way, the imaging device 213 may be able to expand or narrow a viewing range or shift its viewing range from side to side and up and down.

The game console 210 may have image-processing functionality that is capable of identifying objects within the depth cloud. For example, individual people may be identified along with characteristics of the individual people. In one embodiment, gestures made by the individual people may be distinguished and used to control games or media output by the game console 210. The game console 210 may use the image data, including depth cloud data, for facial recognition purposes to specifically identify individuals within an audience area. The facial recognition function may associate individuals with an account associated with a gaming service or media service, or used for login security purposes, to specifically identify the individual.

In one embodiment, the game console 210 uses microphone, and/or image data captured through imaging device 213 to identify content being displayed through television 216. For example, a microphone may pick up the audio data of a movie being generated by the cable box 218 and displayed on television 216. The audio data may be compared with a database of known audio data and the data identified using automatic content recognition techniques, for example. Content being displayed through the tablet 212 or the PC 214 may be identified in a similar manner In this way, the game console 210 is able to determine what is presently being displayed to a person regardless of whether the game console 210 is the device generating and/or distributing the content for display.

Entertainment service 230 may comprise multiple computing devices communicatively coupled to each other. In one embodiment, the entertainment service is implemented using one or more server farms. The server farms may be spread out across various geographic regions including cities throughout the world. In this scenario, the entertainment devices may connect to the closest server farms. Embodiments of the present invention are not limited to this setup. The entertainment service 230 may provide primary content and secondary content. Primary content may include television shows, movies, and video games. Secondary content may include advertisements, social content, directors' information and the like.

FIG. 2 also includes a cable box 218 and a DVR 217. Both of these devices are capable of receiving content through network 220. The content may be on-demand or broadcast as through a cable distribution network. Both the cable box 218 and DVR 217 have a direct connection with television 216. Both devices are capable of outputting content to the television 216 without passing through game console 210. As can be seen, game console 210 also has a direct connection to television 216 and to the cable box 218 and DVR 217. In one aspect, the cable box 218 and DVR 217 pass content through the game console 210 to the television. Television 216 may be a smart television that is capable of receiving entertainment content directly from entertainment service 230. As mentioned, the game console 210 may perform audio analysis to determine what media title is being output by the television 216 when the title originates with the cable box 218, DVR 217, or television 216.

In one aspect, the game console is able to control the cable box 218, DVR 217, or television 216 by blasting infrared commands using the infrared light on the imaging device 213 or a separate infrared blaster (not shown). Device information for the cable box 218, DVR 217, or television 216 may be entered into the game console 210 to enable the correct infrared frequencies to be used to control the other devices. In one aspect, the tablet 212 runs a companion application that provides a remote interface with controls for the cable box 218, DVR 217, or television 216. A user's instructions with the remote are communicated from the tablet 212 to the game console 210 and then blasted to the cable box 218, DVR 217, or television 216.

Communication Session Between Primary Device and Companion Device

Figure 3:
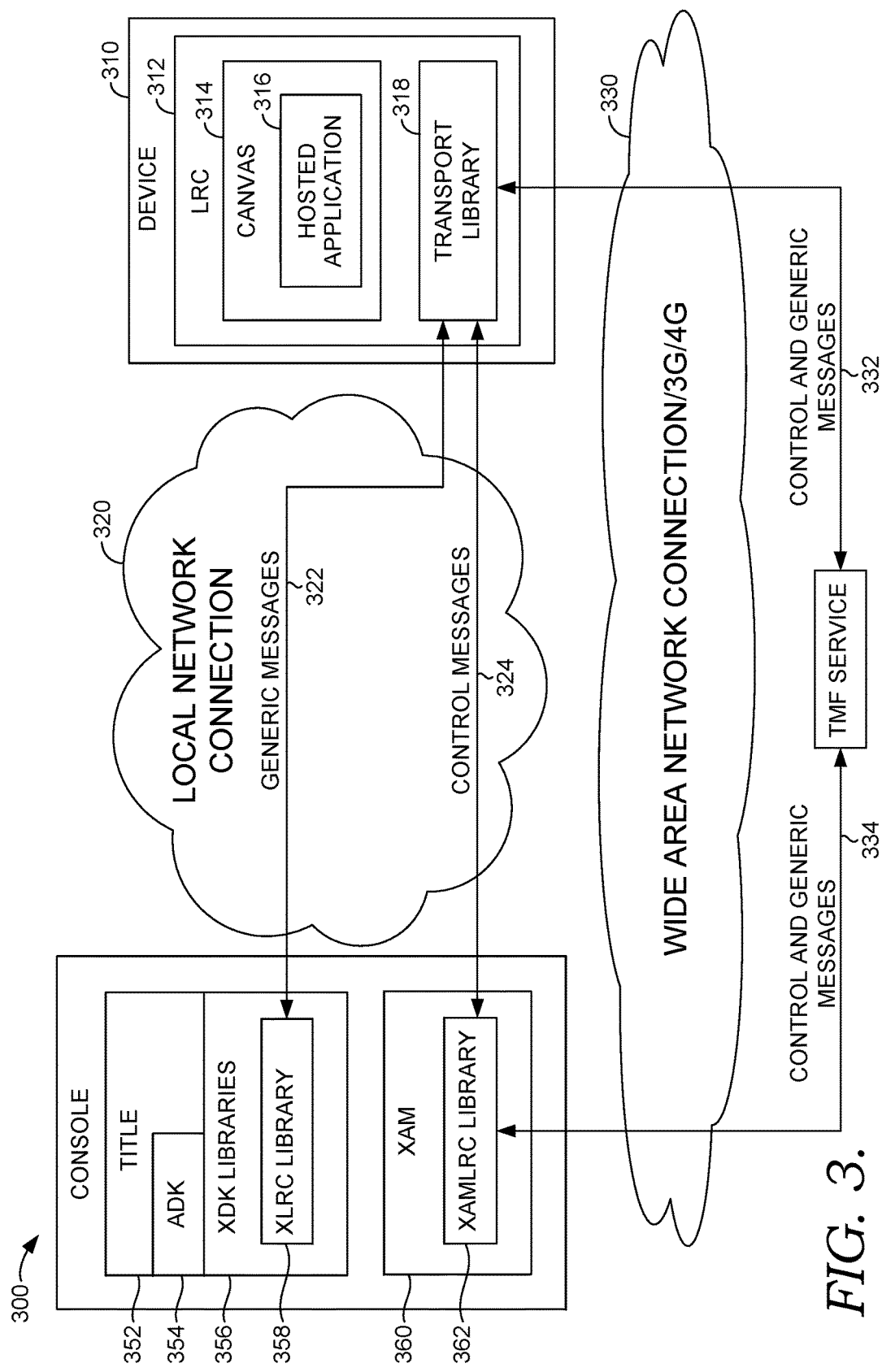
FIG. 3 is a diagram of a computing system architecture for generic messaging between a primary device and a companion device, in accordance with an embodiment of the present invention.

Turning now to FIG. 3, an exemplary diagram 300 is illustrated for generic companion-messaging between a device 310 and a console 350, in accordance with an embodiment of the present invention. The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX® provided by Microsoft Corporation of Redmond, Wash.) developer toolkit ("XDK") title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 can provide an encrypted, communication channel between a title running on the console 350 and the LRC hosted application 316. The LRC 312 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneously connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used with added reliability. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network 320 or TMF service 340 via the wide area network 330. The TMF sends control and generic messages 332 and 334 between the device 310 and the console 350. Generic messages can include other title specific messages (e.g. touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 is made aware of a local network connection when the device 310 successfully connects and then sends a title message session initialization message (e.g., XLRC_MESSAGE_CONNECT). Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport is TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this involves sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint the device 310 is completely un-trusted when communicating with the console 350. The reverse is also true; the console 350 is completely un-trusted when communicating with the device 310. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC-SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In an effort to mitigate some of the risk in having un-trusted, opaque data consumed by titles or hosted applications the contents of messages are accessible through a set of hardened function calls. The JSON protocol may be used for all generic message data. On the console 350, this will be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Remote Application Control

Figure 4:
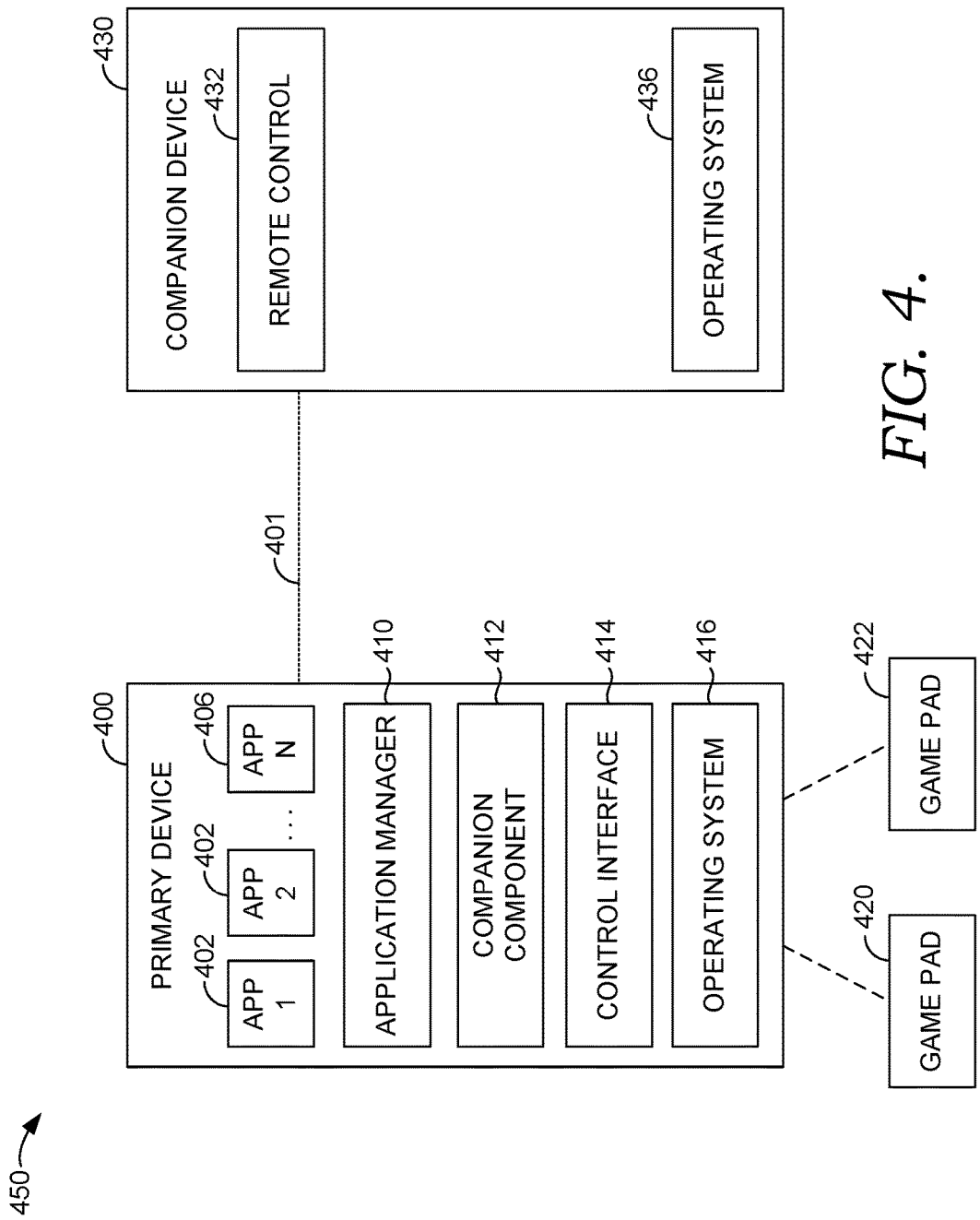
FIG. 4 is a diagram of a computing system architecture for controlling an application running on a primary device using a companion device, in accordance with an embodiment of the present invention.

Turning now to FIG. 4, an exemplary computing environment 450 suitable for use with aspects of the invention is shown, in accordance with an aspect of the present invention. Exemplary computing environment 450 includes a primary device 400 connected to companion device 430 by communication link 401. The communication link 401 may be formed in any manner including those described previously with reference to FIG. 2. The communication link 401 can be wired or wireless, direct or indirect. In one aspect, the communication link occurs over a local area network and the companion device 430 is located within the primary device's presentation area.

The primary device 400 is a computing device having hardware and software suitable for running multiple media applications. Exemplary media applications have been described previously and include applications capable of engaging video games, audio content, audiovisual content, webpages, or other content to generate a media presentation.

The primary device includes an operating system 416, a control interface 414, a companion component 412, an application management component 410, a first application 402, a second application 404, and an $n^{th}$ application 406. Aspects of the present invention are not limited to primary devices running three applications. Three applications were selected for use in this example for the sake of simplicity.

The operating system 416 manages hardware resources on the primary device and enables the primary device 400 to run applications.

The control interface 414 receives input from one or more control devices such as a gamepad 420 and a gamepad 422. Other dedicated devices could include a remote control, a keyboard, a mouse, a microphone, and a camera. In one aspect, the camera may be used to provide a gesture interface. In one aspect, the microphone can be used to provide a natural language interface. The control devices may be used to control an application running in the control focus on the primary device 400.

The companion component 412 interacts with the control application 432 on the companion device 430. The companion component 412 generates instructions that are sent to the applications on the primary device. The applications respond to the instructions by manipulating the applications according to the instructions. In one aspect, the in focus control application is manipulated. When the user changes the control focus through the primary device a state message can be sent to the companion device 530 to identify the newly in focus control application. In response to the state message, the control application can automatically target the in focus application and update the contextual remote control interface to match the in focus application.

The application management component 410 manages viewports generated by different applications. A viewport may be in the foreground or background. The foreground and background state of a viewport may be changed using controls received by the control interface 414. Additionally or alternatively, the control application 432 may generate instructions to change the foreground/background state of an viewport. A foreground vewport may consume the entire display area available to the primary device when in full screen mode. Alternatively, a foreground viewport may consume less than the entire display area available to the primary device, such as 75% of the available display area, 50% of the available display area, or 25% of the available display area.

The companion device 430 is a computing device having hardware and software capable of generating a control interface for the user and communicating control instructions to the primary device 400. Exemplary companion devices include a tablet and a smartphone. The companion device 430 includes an operating system 436 that manages the companion device's hardware. The companion device 430 and the primary device 400 can run different operating systems. Alternatively, the companion device 430 and the primary device 400 can run the same operating system. The companion device can include a touch screen.

The control application 432 generates an contextual remote control interface that presents controls for one or more applications running on the primary device. The contextual remote control interface can be used to control an application running on the primary device. In one aspect, the control application 432 can target a different process or application running on the primary device. The targeting defines which application will be controlled by the control application 432 through the companion device 430. In one aspect, the control interface automatically targets an application in control focus on the primary device. In another aspect, the user may switch the control application's targeting from application to application. In one aspect, changing the targeting on the companion device automatically changes the control focus on the primary device to the targeted application. In one aspect, the control application 432 may target an application that is in control focus or out-of-control focus on the primary device. As used herein, targeting refers the application being controlled by the control application 432 through the companion device.

Figure 5:
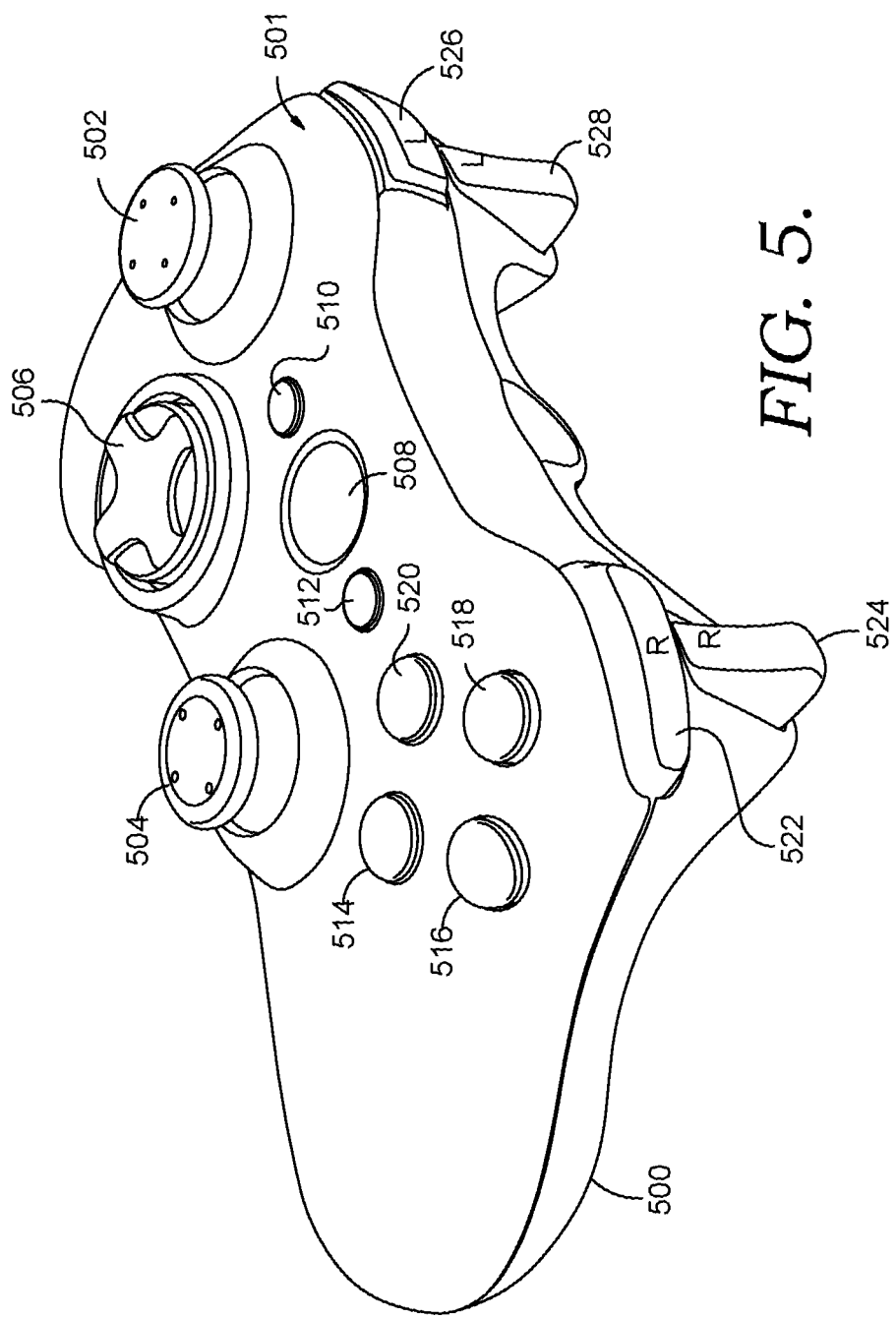
FIG. 5 is a diagram of a standard gamepad.

Turning now to FIG. 5, a gamepad controls on standard gamepad 500 is shown. Any control on a gamepad may be described as a gamepad control herein. The gamepad 500 comprises several gamepad controls, including a left stick 502 and a right stick 504. Gamepad controls on the top side 501 of gamepad 500 includes a direction pad 506, a guide button 508, a back button 510, a start button 512, and face buttons 514, 516, 518, and 520. Other gamepad controls on the gamepad 500 are a right bumper 522 and a right trigger 524. The gamepad 500 also includes a left bumper 526 and a left trigger 528.

The gamepad 500 is ergonomically designed to be held by both the user's right and left hand. The left hand may control the left stick 502 along with the left bumper 526 and the left trigger 528. A user may prefer to control the left stick 502 with his left thumb, the left bumper 526 with his left index finger, and the left trigger 528 with his left middle finger. The right hand may control the right stick 504 along with the right bumper 522 and the right trigger 524. A user may prefer to control the right stick 504 with his right thumb, the right bumper 522 with his right index, and the right trigger 524 with his right middle finger. The face buttons 514, 516, 518, and 520 may also be controlled by the user's right hand.

The different controls on the gamepad 500 control different features of a game. For example, moving the left stick 502 may translate a player through the game while the right stick 504 rotates the view. Game developers can establish each button's function in a game.

As used herein, the phrase "activating a gamepad control" means interacting with a gamepad control to cause a functional instruction to be communicated from the gamepad 500. For example, pushing a face button is an example of activating a gamepad control. In response to pushing a face button, the gamepad generates a functional instruction that is communicated to the gaming device. The gaming device interprets the functional instruction as a push of the face button. This instruction may be fed to a video game title and the game manipulated according to the consequence of pushing the face button. Moving a stick is another example of activating a gamepad control. Holding a stick or a button in a particular position or state may cause multiple functional instructions to be generated by gamepad.

Turning now to FIG. 6, a contextual remote interface 602 is illustrated, in accordance with an aspect of the present invention. The contextual remote interface 602 is generated by a control application running on companion device 600. In this example, companion device 600 is a smartphone. Aspects of the present invention are not limited to use with smartphones.

The companion device 600 displays the interface 602 through a touchscreen display. The remote interface 602 may be activated by pushing a button on a home screen (not shown) for the control application. For example, an active-application bar may be displayed showing what is currently playing or running on a primary device. This bar may have a button to activate the remote interface 602.

The contextual remote interface 602 may be opened without disrupting the state of other applications running on the companion device 600. In one aspect, the contextual remote interface 602 covers the entire display available on the companion device 600 as an overlay. In another aspect, the remote interface 602 covers less than the entire display, such as 90% of the display, 80% of the display, or less.

The contextual remote interface 602 comprises four different portions: the remote selection area 610, the primary device control area 620, the gesture control canvas 630, and the contextual direct control area 640. The remote selection area 610 also includes a close button 616 that closes the remote interface 602.

The remote selection area 610 includes an interface through which different remote interfaces can be selected. In one example, the different interface options are accessed through selectable tabs. In another example, the different remote options are selected using buttons.

In the aspect shown in FIG. 6, two different remote options are available. Selecting button 612 will show the game system remote control interface, which is the interface shown in FIG. 6. Selecting button 614 will show a DVD remote control interface, such as the interface shown in FIG. 9. In one aspect, the primary device is a game system or game console. The game system may control one or more other entertainment devices such as DVD players, cable boxes, televisions, digital video recorders, smart televisions, and such, using an infrared emitter. In one aspect, each device may have a customized remote interface. When other entertainment devices are being controlled the companion device may send a control command over a Wi-Fi connection to the primary device. The primary device then translates the command into an infrared signal appropriate to the entertainment device. The infrared signal may be omitted by an infrared imaging device communicatively coupled to the primary device.

Figure 8:
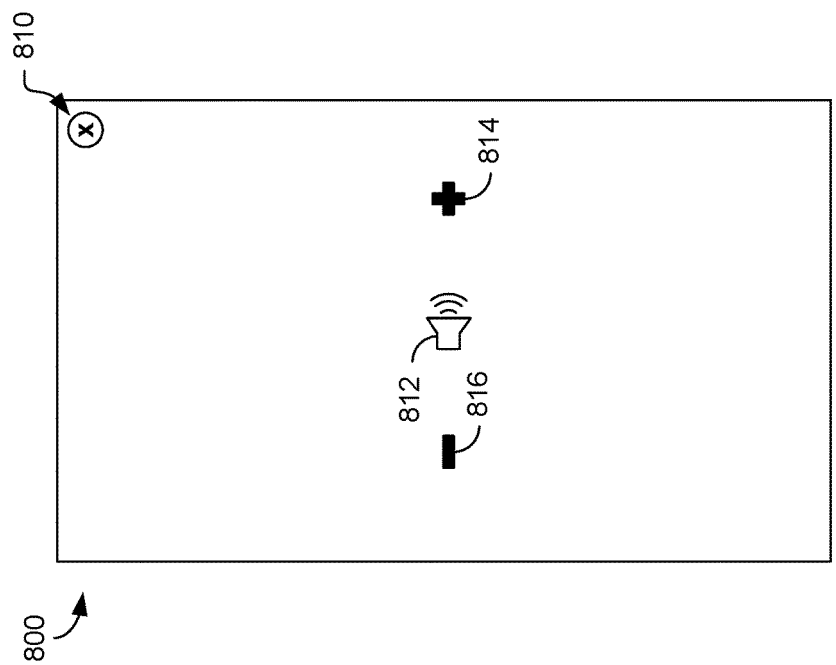
FIG. 8 is a diagram of a volume control interface, in accordance with an embodiment of the present invention.

The primary device control portion 620 includes virtual controls that control aspects of the primary device. These virtual controls may mimic hardware buttons on the primary device or on a controller dedicated to the primary device, such as a gamepad or remote control that comes with the device. As mentioned, the primary device in the example of FIG. 6 is a game console and the buttons in area 620 correspond to controls for a game console. The audio control button 621 activates an audio control interface through which the game system's volume may be increased, decreased, muted, or unmuted. An exemplary audio control interface is shown in FIG. 8.

The view button 622 may be a soft control for the primary device that performs different tasks in different applications. Different applications running on the primary device may have a different response to the soft control associated with the view button 622. In one example, the view button 622 is a selection or start button. In another aspect, the view button 622 opens a specific interface associated with an application in control focus on the primary device.

The home button 624 returns the primary device to the primary device's home screen. The menu button 626 will open a menu associated with an active interface on the primary device. The back button 627 will cause the active interface on the primary device to navigate back a screen.

The gesture control canvas 630 provides a touch pad for control of a cursor associated with an application running on the primary device. The user may drag his finger across the gesture control canvas 630 to move the cursor. The gesture control canvas 630 may also respond to various one and two finger gestures. For example, a single touch may move a cursor where touching with two fingers may activate a selection function, a zoom function, or other similar function. Tapping on the gesture control canvas may activate a selection button, such as button A on a gamepad.

Examples of gestures enabled by the gesture control canvas 630 are shown with reference to FIGS. 12-14.

The contextual control area 640 includes contextual controls specifically selected for an application in control focus on the primary device. Further, the controls may be selected based on the media engaged by the application and the play state of the media presentation. The contextual controls included in the contextual control area 640 include a previous control 642, a pause control 644, and a next control 646. The controls shown in FIG. 6 may be provided when a media application is playing a movie or music. The next and previous controls move to the next track or section of a movie. The pause control 644 may be replaced with a play control when the state of the media presentation is paused. The inclusion of the pause control 644 occurs when the media presentation is currently playing. In one aspect, the contextual control area 640 disappears when the user is interacting with the gesture control canvas 630.

As mentioned, the contextual control area 640 can include different controls based on the application in control focus on the primary device and the state of the media presentation within the application. In one aspect, no controls are shown if the active application does not have the capability to play media or is not currently engaged with a media title. For example, a movie application has the capability to engage with a media title, but no contextual controls would be shown if a media title has not been selected for engagement in the first place. Once a media title is engaged with the streaming movie application, then various contextual play controls appropriate for the movie presentation are selected, such as those shown in FIG. 6.

In one aspect, the contextual controls are also omitted if the active application is a video game. Alternatively, the contextual controls for a game could include stopping or pausing gameplay. If the game application enables recording gameplay to generate a brag video, then the contextual controls could comprise a recording play function and stop recording play.

Contextual controls may be omitted when live TV is being watched without DVR support. In another aspect, the contextual controls include channel up and channel down when live TV is being watched without DVR support. In one aspect, live TV may be viewed through the primary device. For example, the primary device may have a tuner or receive a signal from a cable box or other device that enables live TV.

In one aspect, where live TV is being viewed through an application with DVR support but no skip support, then the play controls may include a previous button, a play or pause button, and a next button. If live TV is being watched through an application with DVR support and skip support, then the contextual play controls could include a skip back button, a play or pause button, and a skip forward button. Other variations are possible.

Turning now to FIG. 7, a contextual remote interface 702 is depicted, in accordance with an aspect of the present invention. Interface 702 includes the same features as described previously with reference to FIG. 6; however, edge face buttons 720, 722, and 724 are now provided. In addition, a control instruction 726 is shown to help guide the user to correctly use the gesture control canvas 630. The edge buttons map to the X, Y, and B face buttons on a gamepad. Selection of the edge button 720 produces a control signal that is equivalent to activation of the Y button on a gamepad. Upon selection of the edge button 720, a command would be sent to the primary device that would be recognized by the primary device as the selection of a Y button, and the same action would be taken as if the Y button had been pushed on a gamepad. The edge button 722 serves as a virtual X control for a gamepad. The edge button 724 serves as a virtual B control for a gamepad.

The control application may be installed on companion devices having various sized screens. The edge buttons may be scaled based on a percentage of the screen consumed. In one aspect, the control application scales the B button 724 to run along 80% of the right side of the available screen. The Y edge button 720 and the X edge button 722 may each run along 30% of the left side of the screen. In one aspect, a gap is included between the Y button 720 and the X button 722. The gap may comprise 20% of the screen. In one aspect, the edge buttons 720, 722, and 724 have a thickness greater than 7 millimeters and less than 10 millimeters.

Turning now to FIG. 8, an audio control interface 800 is shown, in accordance with an aspect of the present invention. In an aspect, the audio control interface 800 controls the volume on the primary device and is displayed on the companion device. The audio control interface 800 includes a close interface control 810, a mute control 812, a volume up control 814, and a volume down control 816. In one aspect, selecting any portion of the right half of the interface 800, excluding the close interface control 810, causes the volume to go up. Similarly, selecting any portion of the left-hand side of the interface 800 can cause the volume to go down. Conceptually, the audio control interface 800 can be thought of as divided into three virtual buttons (i.e., volume up, volume down, and mute). This allows the audio to be controlled easily without the user having to look carefully at where he is contacting a touch screen. Allowing the user to control the volume without having to remove his attention from the interface generated by the primary device can increase efficiency. In one aspect, the audio control interface 800 closes automatically after no input is received from the user for a threshold period of time. In one aspect, the threshold period of time is more than two seconds, for example five seconds. In one aspect, the threshold period of time is less than twenty seconds, for example ten seconds.

Figure 9:
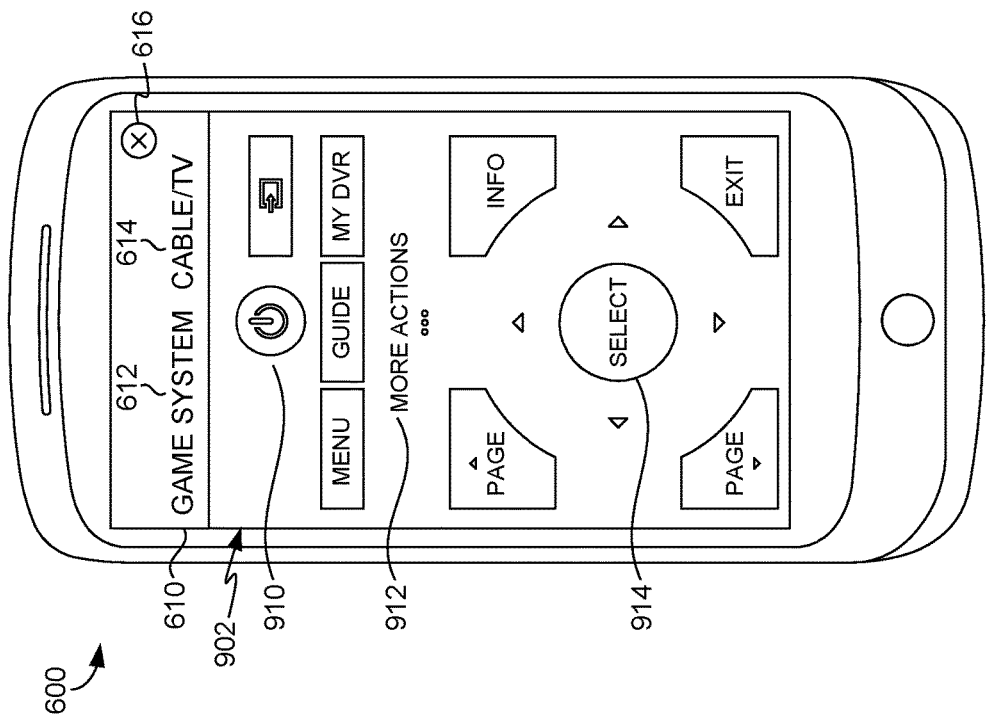
FIG. 9 is a diagram of a companion device showing a control interface that can control an entertainment device through a primary device, in accordance with an embodiment of the present invention.

Turning now to FIG. 9, a remote interface 902 to control an entertainment device that is a separate physical device from the game system is shown, in accordance with an aspect of the present invention. The remote interface 902 may be displayed in response to selecting the cable TV button 614. The remote interface 902 replaces the primary device control area 620, the gesture control canvas 630, and the contextual control area 640. The remote selection area 610 remains visible. A companion device could have a series of different remote interfaces for different entertainment devices.

The remote interface 902 includes controls suitable for the cable box. In this example, the cable box is a separate physical device that is different from the game system. In one aspect, the use of the controls on the remote interface 902 cause a control message to be communicated to the game system, which in turn sends an infrared signal to the cable box. The infrared signal may be generated by an infrared blaster communicatively coupled to the game system.

The controls on the remote interface 902 include a power control 910 and a "more actions" button 912, which opens an additional interface with commands for the cable TV box. The virtual skeuomorphic control 914 controls various functions of the cable box.

Figure 10:
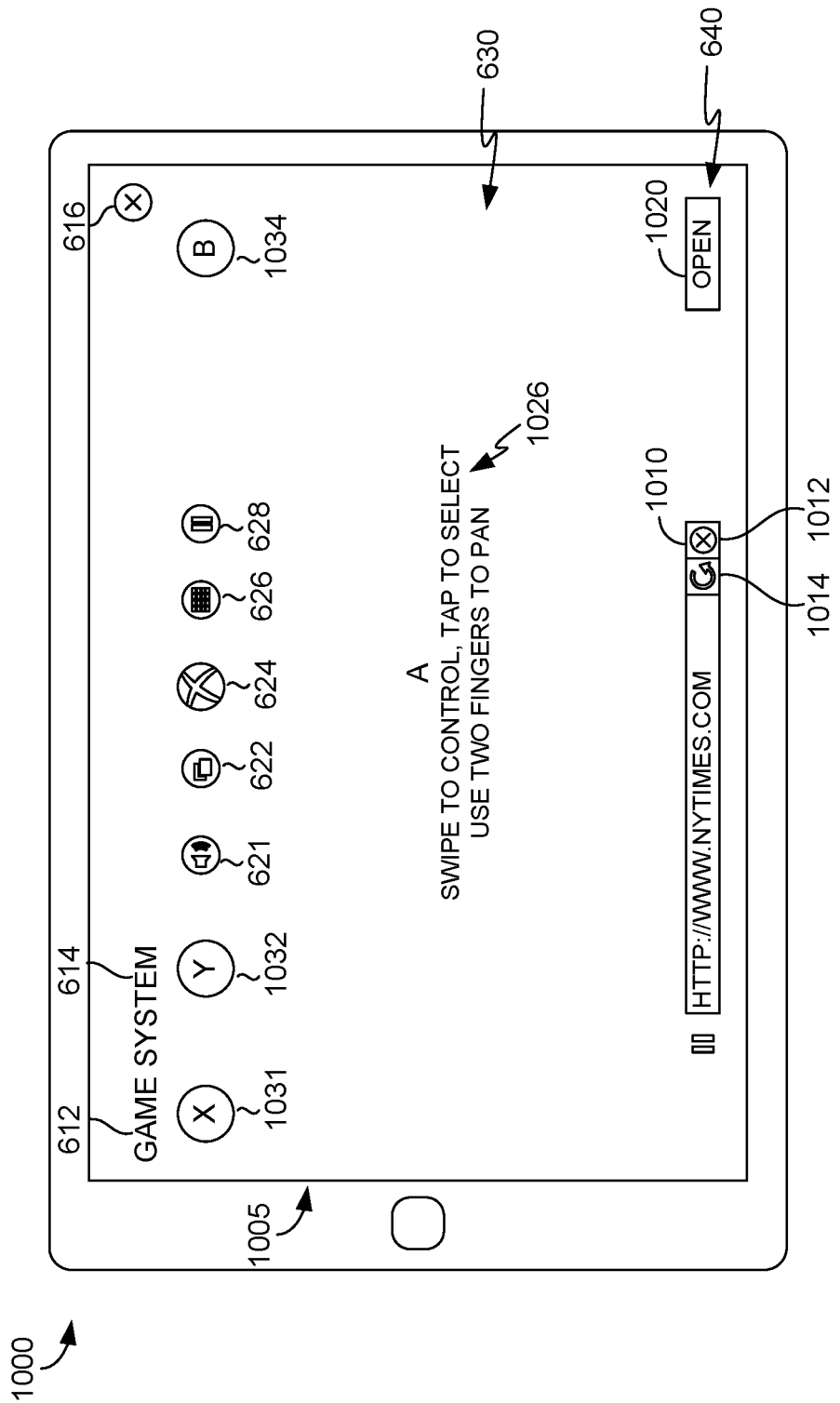
FIG. 10 is a diagram of a companion device showing a control interface that can control an Internet browser, in accordance with an embodiment of the present invention.

Turning now to FIG. 10, a contextual remote interface 1005 customized to control an internet browser is shown, in accordance with an aspect of the present invention. In addition to the buttons described previously with reference to FIG. 6, the interface 1005 includes an virtual X control 1031, a virtual Y control 1032, and a virtual B control 1034. Each of these virtual controls correspond to face buttons on a gamepad associated with the primary device. A user instruction 1026 helps the user correctly control the gesture control canvas 630. The contextual control area 640 includes controls adapted for a web browser. The contextual controls include an address bar 1010 with the address of a website the user has navigated to on the primary device shown. The contextual controls also include a refresh control 1014 and a stop control 1042. Further, an open control 1020 is included to the far right. The controls shown in FIG. 10 are those provided when there is no video content on the site being visited. The actual website would be displayed through the primary device.

Figure 11:
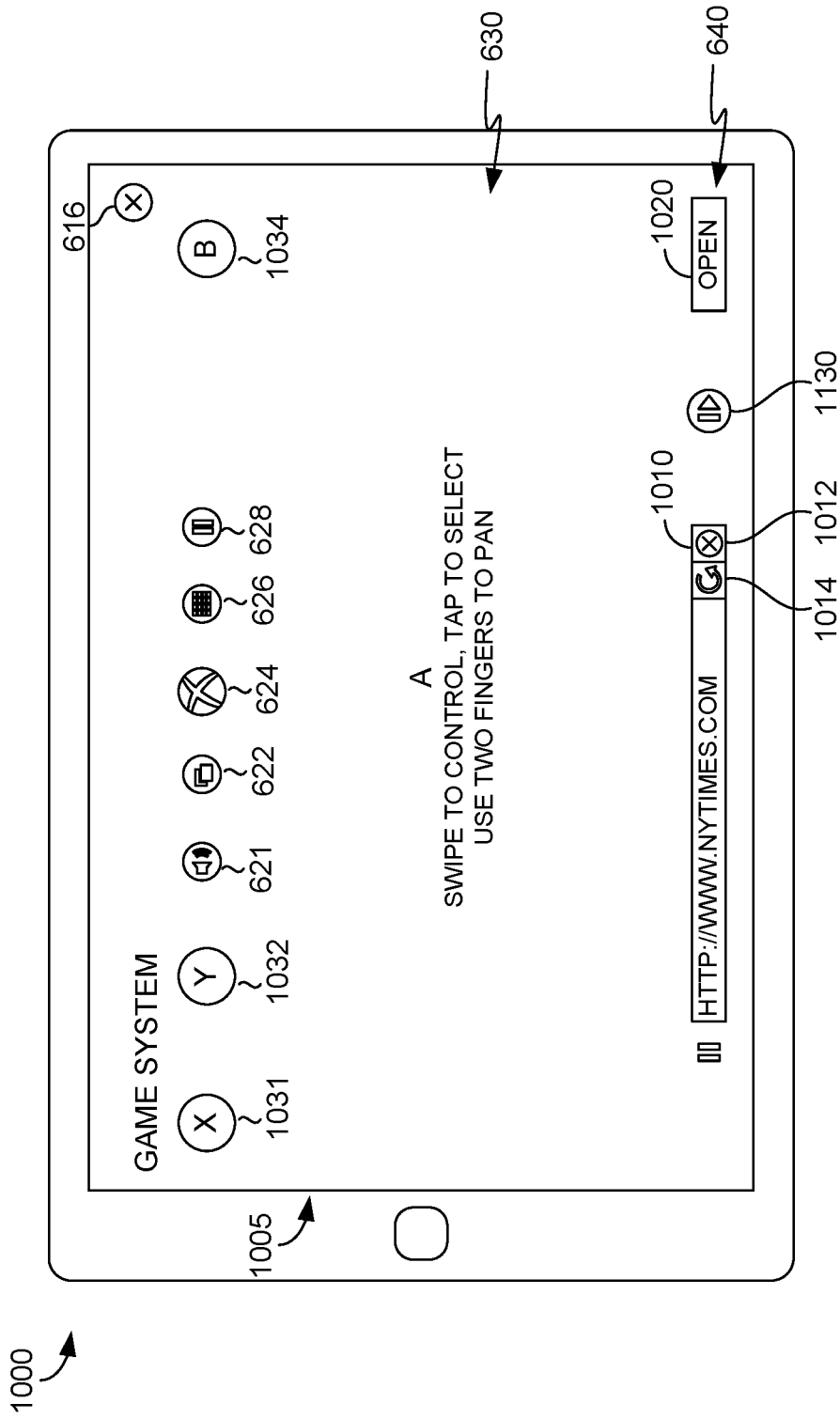
FIG. 11 is a diagram of a companion device showing a control interface that can control an Internet browser with video content, in accordance with an embodiment of the present invention.

Turning now to FIG. 11, the controls shown in FIG. 11 are those present in the contextual control area 640 when the webpage active on the primary device includes video content. In addition to the controls described previously with reference to FIG. 10, a play pause control 1130 is included within the interface.

Cursor Movement and Object Selection

Turning now to FIG. 12, control of a cursor 1220 associated with a game console's browser 1215 using a companion device 1230 is shown, in accordance with embodiment of the present invention. A display device 1210 that is communicatively coupled with the game console displays the browser window 1215. In the free-cursor-movement control mode, the user may move a cursor 1220 associated with the browser window 1215 by moving their finger 1235 across the touch screen 1233 on the companion device 1230. The user may then tap their finger 1235 on the touch screen 1233 to select a link or other selectable feature displayed in the browser window 1215. The cursor may take the form of a line, an arrow, a circle, or other shape.

Initially, touch input is received by the companion device. The touch points associated with the touch input are communicated to the game console. The control application on the companion device may normalize the touch points, forming normalized touch input. This means the actual pixel location (x, y) of the touch data are divided by the size of the touch area in pixels to yield a float between 0 and 1. For example, on a 480×800 screen, the touch point at (100,200) is sent as (0.2083333333333333, 0.25). These numbers are calculated by dividing 100 by 480 and 200 by 800.

Touch points are sent with a timestamp in milliseconds, so that the game console can incorporate timing based analysis as appropriate (e.g. for tap and drag detection). In one embodiment, the game console does not care what the base of the timestamp is; it only calculates deltas between timestamps. The console may assume the timestamp is the timestamp of the actual touch event, not the timestamp for when the message was created or sent. This allows the console to accurately detect tap events even when network stack delays and latency issues are involved.

In some embodiments, the companion device implements a throttling algorithm, which is designed to reduce the frequency that touch data is sent across the network, in order to better match the network characteristics. A companion device may send a ping to the game console, calculate the trip time, divide by two, and use the result to calculate transport time. For low latency connections, companion devices may attempt to send touch data at a frame rate that matches the browser frame rate (e.g. to achieve 60 frames per second (FPS) touch points are sent no more frequently than every ~16 ms). For higher latency connections, companion devices may send data at a lower frequency (e.g. 30 FPS or 20 FPS).

Below 20 FPS, movement feels choppy and devices may avoid using touch as an input mechanism. When this degree of latency is detected, the touch control may be deactivated and an explanation message provided to the user. As an alternative, gesture interpretation native to the companion device may be used and only the interpretation communicated to the game console.

Various throttling algorithms may be used to avoid spamming the network. In one example, if no touch points are active, then when the first touch point arrives, the companion device sets a timer to fire at desired frame rate (e.g. 60 FPS). The companion device may store current touch ID, coordinates, and timestamp in an array of touch points (e.g. 5), and sets a flag to indicate whether the data has been sent to the game console yet. If new touch point move data arrives, then locations are updated. When the timer fires, if the flag is not set, the device does nothing, otherwise the device sends all active touch points and clears the flag. If an up event arrives, the message is sent immediately, without waiting for the timer. This allows the device to collapse frequent move points to a single update. In one embodiment, the companion device sends all active touch points.

The game console interprets the touch data to determine how far to move the cursor. When the game console receives a touch point, the coordinates are scaled from the normalized touch data to game console screen coordinates by multiplying the normalized points by game console's screen dimensions. This allows the game console to effectively do direct mapping of device coordinates to the game console's screen. For example, on a 480×800 screen, the touch point at (100,200) is sent as (0.208,0.25). On game console this is scaled according to current screen size (1920,1080) to produce a scaled touch coordinate of (400, 270). Cursor movement be may calculated per frame using incoming touch data. Touch data generated by scaling the normalized touch data according to the primary device's screen size may be described a scaled touch data.

In one embodiment, the game console uses the scaled touch data without additional scaling or adjustment to interpret cursor movement. Without additional adjustment, the percentage of companion device screen traversed may be directly correlated to the cursor movement on the game console's screen. For example, if touch input traverses 50% of the companion screen's width than the cursor may be moved 50% of screens width on the game console. The scaled touch data may be used when the companion device has a screen falling into a designated range. Upon determining the screen on the companion device is in the designated range the scaled touch data may be interpreted. When outside the range, additional adjustments may be made to the scaled touch data before using it to generate a control input. In one embodiment, displays with a width less than three inches fall into the designated range. As orientation changes from portrait to landscape, some devices may transition out of the designated range.

In an embodiment, the scaled touch data is further modified before interpretation. Additional adjustments could be made in all cases or, as mentioned above, a screen size could used to determine whether additional adjustments are made. The additional adjustments attempt to normalize the input across various screen sizes to match optimized movements.

Taking the previously generated scaled touch data as input, next, device size optimization is applied. The game console's screen coordinates are scaled by multiplying by the ratio of the actual companion device to template screen size. For example, the points above (400, 270) are multiplied by (1.13, 1.13) to generate (454.152, 306). The 1.13 number is the ratio of the actual companion device's screen area to the template screen size area. This process generates optimized touch data.

When interpreting the touch data, the game console remembers the previous location and calculates a delta between points. The delta may be calculated for each frame of touch data received. In an embodiment, the delta is further adjusted to generate dampening and acceleration. The formula $nx^{\wedge}p$ could be used, where n is a dampening coefficient (0.35), p is an acceleration component (1.25), and x is the delta. The effect is that for small deltas, the cursor moves small amounts and for large deltas the cursor moves even farther. The net effect for the user is that moving quickly over an inch on the companion device moves the cursor farther than moving slowly over the same physical distance.

In one embodiment, a cursor movement is derived from each frame of touch input. The cursor movement may be expressed as a new destination coordinate or in terms of movement length and direction. Once calculated, the cursor is moved from its existing location the derived distance. When a new touch event occurs, and is interpreted as a movement command, the cursor movement begins at the cursor's present location. Thus, for the first frame delta in a movement touch event, the new location is calculated by adding the derived movement to the cursor's present location.

In one embodiment, all single finger gestures on the screen are interpreted as cursor movement. Cursor movement may also include selecting an object and dragging an object. A tap is derived from the data when the following pattern is observed within a threshold time: a touch is detected, less than a threshold of movement occurs, followed by an up detection that describes a user removing their finger from the touch screen. Different movement thresholds may be used, but in one embodiment the movement threshold is less than 30 pixels and threshold time between the user touching the screen and removing their finger is 250 ms.

A single tap may select an object adjacent to the cursor. The user may then drag the object by moving the cursor. The object may be released by tapping the screen again. An object may be selected by double tapping the object. Other selection methods are possible.

In one embodiment, audio input captured by the companion device and communicated to the primary device for interpretation is used to control the cursor. For example, a user may speak, "select," "drag," "drop," "delete," or other similar command. The command is interpreted in view of the current cursor location within the application running on the primary application. Thus, a nearby object may be selected. In one embodiment, the microphone on the companion devices captures the audio data and communicates the audio data to the primary device, which interprets the audio data.

Two Finger Pan/Scroll Gesture

Turning now to FIG. 13, a pan gesture is illustrated, in accordance with an embodiment of the present invention. Shown in FIG. 13 are a display device 1310, a browser 1315 window in the display device, a user's fingers 1335 and a companion device 1330 having a touch screen 1333. To implement the scroll or pan gesture, the user drags two fingers 1335 across the touch screen on the companion device. The fingers 1335 may be spaced apart from each other greater than a threshold distance for the gesture to be recognized. In response, the content in the browser 1315 scrolls up or down accordingly. In one embodiment, the speed of the scrolling correlates with the speed of the pan gesture on the touch screen 1333.

As described above with reference to cursor movement, the touch points received by the game console are used to recognize the touch/pan gesture. As with the cursor control, the companion device may normalize the touch data. The game console, then may generate scaled touch data by multiplying the normalize data by the game console's screen size. The scaled touch data may be optimized to a template screen size. In one embodiment, the scrolling or panning are accelerated or depressed based on the speed of the gesture using the acceleration/dampening algorithm described previously.

In one embodiment, audio input captured by the companion device and communicated to the primary device for interpretation is used to control scrolling. For example, a user may speak, "scroll up," "scroll down," "scroll right," "fast scroll," "slow scroll," "medium scroll," "stop scroll," or other similar command. The command is interpreted in view of the current cursor location within the application running on the primary application. Thus, an interface adjacent to the cursor may be scrolled if multiple interfaces are scrollable. If only a single interface is scrollable, then the single interface is scrolled. In one embodiment, the microphone on the companion devices captures the audio data and communicates the audio data to the primary device, which interprets the audio data.

Pinch Zoom

Turning now to FIG. 14, a zoom gesture is illustrated, in accordance with an embodiment of the present invention. FIG. 14 depicts a display device 1410 displaying a browser 1415 generated by a game console (not shown). FIG. 14 also depicts a companion device 1430 having a touch screen 1433 and a user's hand 1435. To perform the zoom gesture, the user pinches their fingers 1435 together while in contact with the touch screen 1433. In response, the browser window 1415 zooms in on its present center point. The degree of zoom may be derived from the distance of the pinch movement and speed of the pinch movement.

Pinch/Zoom is activated when the console detects that a second touch is part of the touch event. The second touch occurs when a second finger touches the screen. The pinch origin is centered on the present cursor location. Future zoom gestures calculate a new origin and magnitude as the cursor is moved. The previously mentioned acceleration logic may be used, where actual values passed to the touch subsystem use modified vector $nx\hat{}p$, where n is a dampening coefficient (0.35), p is an acceleration component (1.25), and x is the delta. The acceleration logic may be applied to the movement of both fingers. The origin point of the touch is centered at the current cursor position, and the vector and magnitude of pinch moves is relative to that point.

The pinch/zoom is differentiated from the two finger scroll by the movement of the fingers. When the fingers move towards each other, the pinch zoom is executed. If the fingers move the same direction while maintaining approximately the same distance, then pan/scroll is executed.

In one embodiment, audio input captured by the companion device and communicated to the primary device for interpretation is used to control zooming. For example, a user may speak, "zoom 200%," "zoom 400%," "zoom in," "zoom out," "slow zoom," "zoom 50%," "stop zoom," or other similar command. The command is interpreted in view of the current cursor location within the application running on the primary application. Thus, zoom may center on the current cursor location. In one embodiment, the microphone on the companion devices captures the audio data and communicates the audio data to the primary device, which interprets the audio data.

Figure 15:
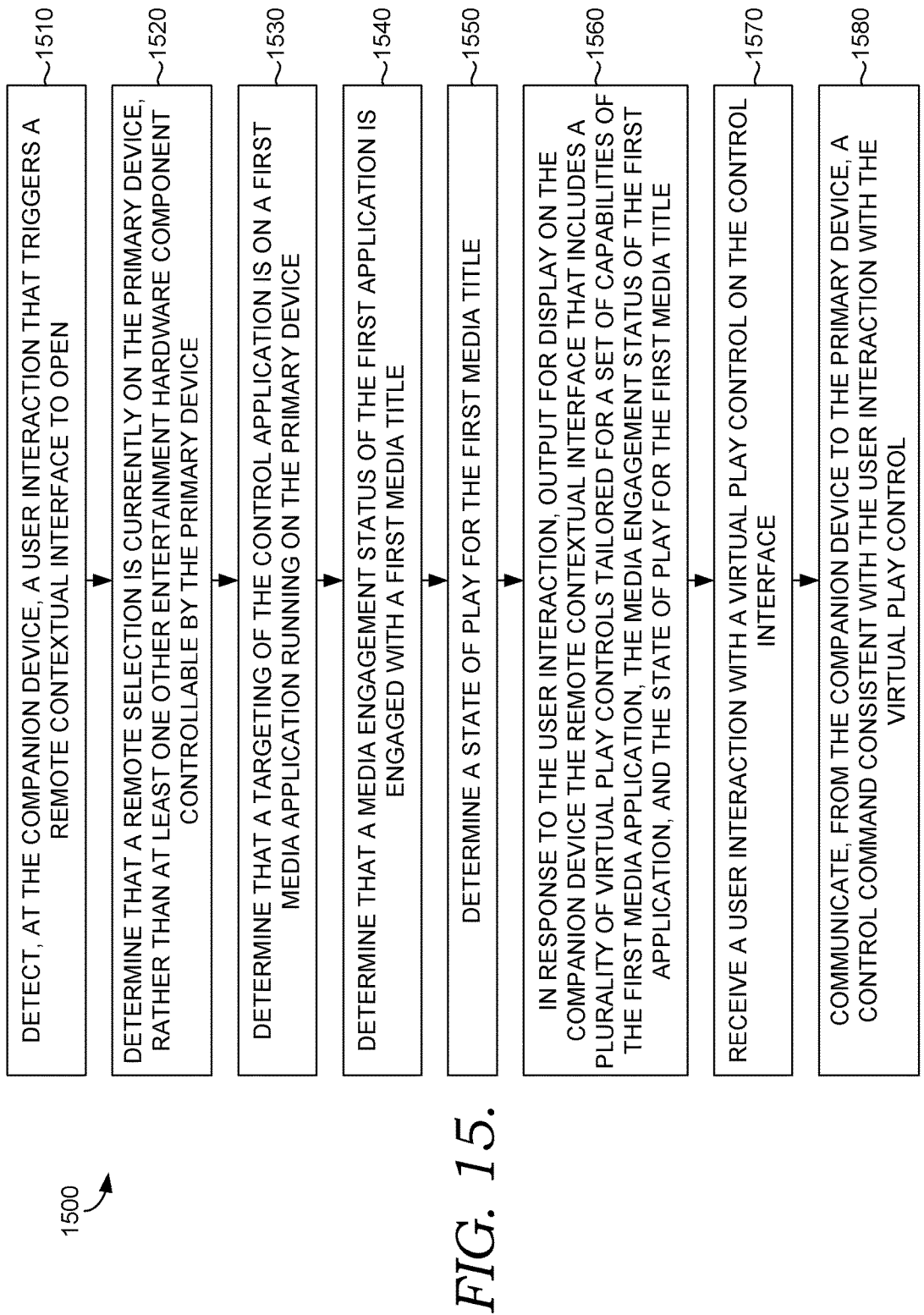
FIG. 15 is a flow chart showing a method of using a contextual remote control interface on a companion device to control an entertainment experience through a primary device, in accordance with an embodiment of the present invention.

Turning now to FIG. 15, a method 1500 of using a contextual remote control interface on the companion device to control an entertainment experience through a primary device is shown, in accordance with an aspect of the present invention. Exemplary primary devices and companion devices have been described previously. The entertainment experience can include the presentation of a video game, a television show, a movie, an audio presentation, and the like. In aspects, the entertainment experience may be generated by multiple devices, including a game console, a cable TV box, a DVD player, a DVR, and the like.

In one aspect, the primary device is able to control all of the other entertainment devices in response to instructions received from a contextual remote control interface running on a companion device. In aspects, the companion device communicates directly with the primary device only. For example, the companion device may not communicate directly with a cable box or DVD player. Instead, the primary device translates control instructions received from the companion device into infrared signals that are communicated to the separate entertainment devices. The primary device may go through a setup process where model information and brand information is provided for the entertainment devices. This information can be used to look up the appropriate infrared frequencies and codes required to generate specific instructions.

At step 1510, a user interaction that triggers a contextual remote interface to open is detected at the companion device. For example, the user may select a button on an interface associated with a control application that provides the contextual remote interface. The control application can provide other services in addition to control, such as displaying information about available media and applications.

At step 1520, a remote selection is determined to be on the primary device. As mentioned, the contextual remote interface may facilitate the control of multiple entertainment devices, including the primary device. Thus, at step 1520 the device presently selected for control is determined. The user may change the device to be controlled through the remote selection interface described previously with reference to FIG. 6. Once selected, the selection may persist until the next time the control interface is opened.

At step 1530, a targeting of the control application is determined to be on a first media application running on the primary device. The control application is capable of controlling multiple applications that may be running on any given entertainment device. When multiple applications are running on a device, the user may be given an opportunity to select the application the user wishes to control with the contextual remote interface. The user may control an application that is in control focus on the primary device or other entertainment equipment. The user is also able to control applications that are out-of-control focus on the primary device. As described previously, targeting refers to the application selected on the companion device, which can be independent from a control focus on the primary device. The targeting of an application on the companion device may persist after the contextual remote interface is closed. The control application may also provide one or more interfaces that allow the user to change the application targeted when multiple applications are available.

At step 1540, a media engagement status of the first application is determined to be engaged with a first media title. A media application is engaged with a media title when the user has instructed the media application to engage a media title. For example, a media application may have an album selected for play even though the music is paused. This would be an example of an application engagement with a media title.

At step 1550, a state of play for the first media title is determined. The state of play could be playing, paused, stopped, fast-forwarding, or rewinding. Other play states may be possible. The state of play information along with the status of the first application may be provided in a state message communicated from the primary device to the companion device.

At step 1560, in response to the user interaction, the contextual remote interface is output first for display on the companion device. The contextual remote interface includes a plurality of virtual play controls tailored for a set of capabilities of the first media application, the media engagement status of the first application, and the state of play for the first media title. Examples of tailoring controls to the set of capabilities of the media application have been described previously. In one aspect, no play controls are provided when an engagement status of the first application is "not engaged" with a media title. The state of play can also affect the play controls initially provided. For example, when a media title is actively playing, then a stop or pause control may be provided. When the media presentation is stopped or paused, then a play control may be provided. As the state changes, including in response to instructions received from the contextual remote control interface, the play buttons included may change.

At step 1570, a user interaction with a virtual play control on a control interface is received. For example, a user could have pushed the play button. At step 1580, a control command consistent with the user interaction with the virtual play control is communicated from the companion device to the primary device. For example, the control command could be communicated over a Wi-Fi connection between the devices.

In one aspect, the contextual remote interface further comprises an gesture control canvas that receives a touch input from the user and wherein the method further comprises communicating a set of touch data from the touch input to the primary device for interpretation. The touch input data may be raw data or normalized data that the primary device interprets.

Figures 16, 17:
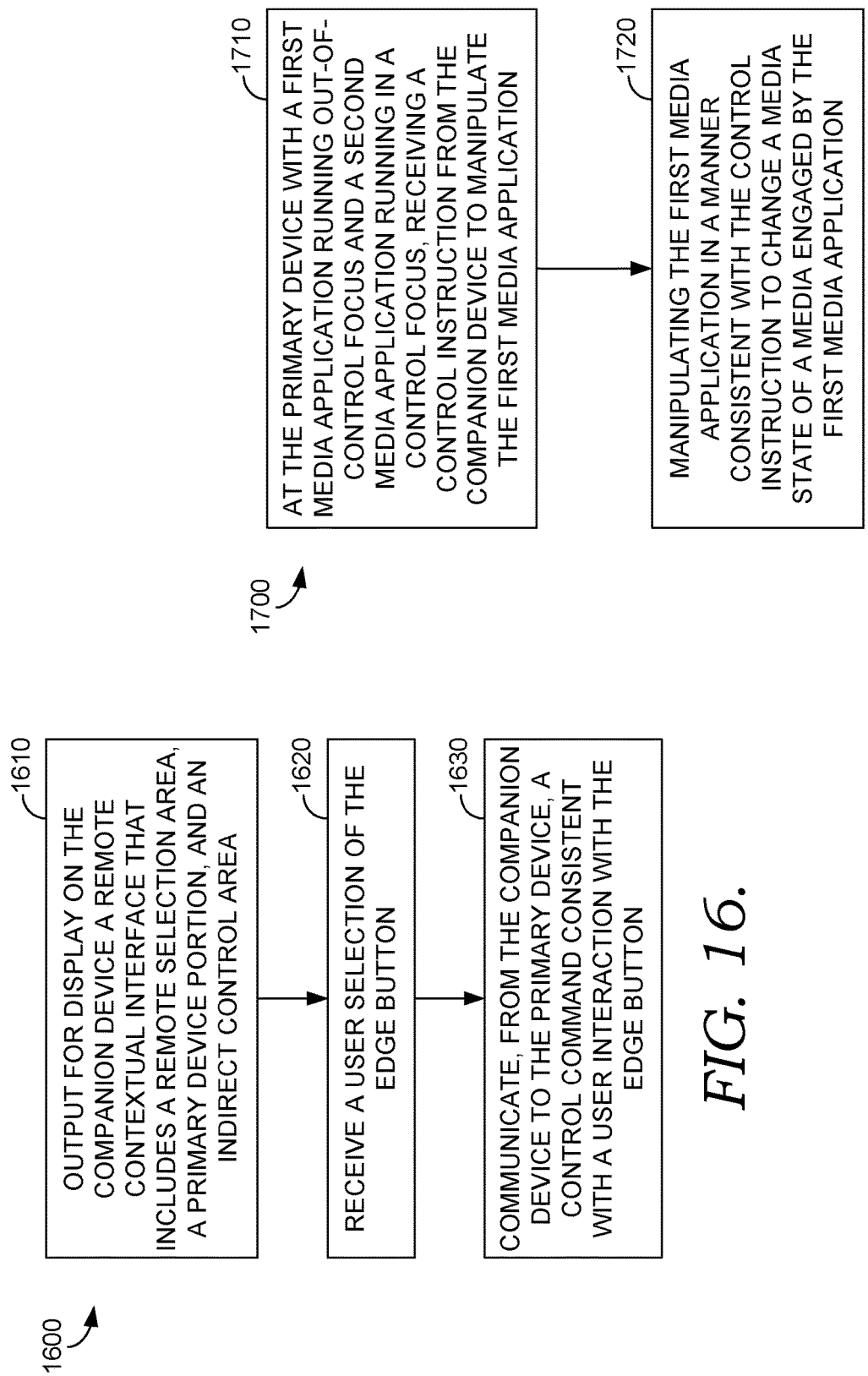
FIG. 16 is a flow chart showing a method of using a contextual remote control interface on a companion device to control an entertainment experience through a primary device, in accordance with an embodiment of the present invention.
FIG. 17 is a flow chart showing a method of using a contextual remote control interface on a companion device to control an entertainment experience through a primary device, in accordance with an embodiment of the present invention.

Turning now to FIG. 16, a method 1600 of using a contextual remote control interface on a companion device to control an entertainment experience through a primary device is shown, in accordance with an aspect of the present invention. At step 1610, a contextual remote interface is output for display on the companion device. The contextual remote interface comprises a remote selection area, a primary device portion, and an gesture control canvas. The remote selection area includes a first function to select a remote interface to control a game console and a second function to select a remote interface to control an entertainment device that is a separate physical device from the game console. For example, the second function may cause a device-specific remote interface to be presented, such as interface 902 described previously.

The primary device portion includes one or more virtual global controls for the game console. The global controls control functions of the game console rather than functions of applications running on the game console.

The gesture control canvas includes a gesture interface and an edge button that is a virtual control mapping to a face button on a game pad. A gesture interface and edge buttons have been described previously with reference to FIG. 7. The gesture control canvas may include multiple edge buttons.

At step 1620, a user selection of the edge button is received. The user may select an edge button by running his finger along the side of the companion device's screen. The edge button may be less than 10 millimeters thick as measured from the edge of the device perpendicularly towards the middle of the touchscreen. The idea is that a portion of the user's finger may contact the edge button and cause the user selection. In one aspect, the edge button runs along the edge of 80% or less of the touchscreen. In one aspect, multiple edge buttons are included along the edge, or edges, of the touchscreen.

At step 1630, a control command consistent with the user interaction with the edge button is communicated from the companion device to the primary device.

Turning now to FIG. 17, a method 1700 of using a contextual remote control interface on a companion device to control an entertainment experience through a primary device is provided, in accordance with an aspect of the present invention. At step 1710, a control instruction is received from the companion device to manipulate the first media application. The first media application is running out-of-control focus on the primary device at the time the control instruction is received. In addition, a second media application is running in control focus on the primary device.

At step 1720, the first media application is manipulated in a manner consistent with the control instruction to change a media state of a media engaged by the first media application. For example, the media state could be changed from stop to play or from play to rewind. Other state changes are possible. In one aspect, the control instruction corresponds to activating a face button on a gamepad. The primary device may interpret the control instruction in exactly the same way as pushing the equivalent face button on the gamepad.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of using a contextual remote control interface on a companion device to control an entertainment experience through a primary device, the method comprising:

detecting, at the companion device, a user interaction that triggers the contextual remote control interface to open the contextual remote control interface generated by a control application running on the companion device;

determining that a targeting of the control application is on a first media application running on the primary device;

determining that a media engagement status of the first media application is engaged with a first media title;

determining a state of play for the first media title;

in response to the user interaction, outputting for display on the companion device the contextual remote control interface that includes a plurality of virtual play controls tailored for a set of capabilities of the first media application, the media engagement status of the first media application, and the state of play for the first media title;

receiving a user interaction with a virtual play control on the contextual remote control interface; and communicating, from the companion device to the primary device, a control command consistent with the user interaction with the virtual play control.

2. The method of claim 1, wherein the contextual remote control interface further comprises an gesture control canvas that receives a touch input from a user, and wherein the method further comprises communicating a set of touch data from the touch input to the primary device for interpretation.

3. The method of claim 1, wherein the first media application is a live television application with digital video recording support and the plurality of virtual play controls comprise a next control, a pause control, a record control, and a previous control.

4. The method of claim 1, wherein the first media application is a live television application with digital video recording support and skip support and the plurality of virtual play controls comprise a skip forward control, a pause control, and a skip backward control.

5. The method of claim 1, wherein a control focus on the primary device is on a second media application.

6. The method of claim 1, wherein the method further comprises receiving a state message from the primary device that identifies the first media application is engaged with the first media title and the state of play for the first media title.

7. The method of claim 1, wherein the primary device is a game console and the companion device is selected from a group consisting of a tablet or a smartphone.

8. A companion computing device comprising:
a processor;
a display;
a hardware computer storage media comprising computer-executable instructions that, when executed by the processor configure the computing system to:
output through the display on the companion device a contextual remote interface, a primary device portion, and an gesture control canvas,
wherein the primary device portion includes one or more virtual global controls for the game console,
wherein the gesture control canvas includes a gesture interface and an edge button that is a virtual control mapping to a control function for an application running on the primary device, wherein the edge button has a visible thickness measured from a side edge of a companion device's touchscreen to an opposite edge of the edge button between 5 and 10 mm;
receive a user selection of the edge button; and
communicate, from the companion device to the primary device, a control command consistent with a user interaction with the edge button.

9. The companion device of claim 8, wherein the edge button has a length along the side edge that is between 30% and 80% of a total length of the side edge of the companion device's touchscreen.

10. The companion device of claim 8, wherein an application is engaged with a media title when the media title is being played by the application.

11. The companion device of claim 8, wherein the method further comprises:
in response to a user selection of the second function to select a remote interface, replacing the gesture control canvas with a device-specific control interface having a plurality of virtual controls that control functions of the entertainment device;
receiving a user interaction with a virtual control on the device-specific control interface; and
communicating, from the companion device to the primary device, a control command consistent with the user interaction with the virtual control.

12. The companion device of claim 11, wherein a communication of the user interaction is not communicated directly from the companion device to the entertainment device.

13. The companion device of claim 8, wherein the method further comprises determining that an application in control focus on the game console is not engaged with a media title and not displaying a play control on the contextual remote interface.

14. The method of claim 8, wherein the method further comprises determining that an application in control focus on the game console is engaged with a first media title and changing the contextual remote interface to comprise a contextual control area comprising a plurality of virtual play controls tailored for a set of capabilities of the application.

15. The method of claim 14, wherein the first media application is a live television application with digital video recording support and skip support and the plurality of virtual play controls comprise a skip forward control and a skip backward control.

16. One or more computer hardware storage media having computer executable instructions embodied thereon, that when executed by a companion device cause the companion device to perform a method of using a contextual remote control interface on the companion device to control an entertainment experience through a primary device, the method comprising:
detecting, at the companion device, a user interaction that triggers the contextual remote control interface to open the contextual remote control interface generated by a control application running on the companion device;
determining that a targeting of the control application is on a first media application running on the primary device;
determining that a media engagement status of the first media application is engaged with a first media title;
determining a state of play for the first media title;
in response to the user interaction, outputting for display on the companion device the contextual remote control interface that includes a plurality of virtual play controls tailored for a set of capabilities of the first media application, the media engagement status of the first media application, and the state of play for the first media title;
receiving a user interaction with a virtual play control on the contextual remote control interface; and
communicating, from the companion device to the primary device, a control command consistent with the user interaction with the virtual play control.

17. The media of claim 16, wherein the contextual remote control interface further comprises an gesture control canvas that receives a touch input from a user, and wherein the method further comprises communicating a set of touch data from the touch input to the primary device for interpretation.

18. The media of claim 16, wherein the first media application is a live television application with digital video recording support and the plurality of virtual play controls comprise a next control, a pause control, a record control, and a previous control.

19. The media of claim 16, wherein the first media application is a live television application with digital video recording support and skip support and the plurality of virtual play controls comprise a skip forward control, a pause control, and a skip backward control.

20. The media of claim 16, wherein a control focus on the primary device is on a second media application.

* * * * *